US006396848B1

(12) United States Patent
Ohta

(10) Patent No.: US 6,396,848 B1
(45) Date of Patent: May 28, 2002

(54) APPARATUS AND METHOD OF ALLOWING USER TO BROWSE HISTORY OF RELAY TRANSMISSION ON DATA TERMINAL

(75) Inventor: Naoki Ohta, Isehara (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/159,107

(22) Filed: Sep. 23, 1998

(30) Foreign Application Priority Data

Sep. 25, 1997 (JP) .............................................. 9-276659

(51) Int. Cl.[7] .................................................. H04J 1/00
(52) U.S. Cl. ...................................... 370/490; 370/352
(58) Field of Search ................................. 370/352, 386, 370/401, 490; 358/402, 468; 709/206; 710/100

(56) References Cited

U.S. PATENT DOCUMENTS

| | | | | |
|---|---|---|---|---|
| 5,812,278 A | * | 9/1998 | Toyoda et al. | 358/402 |
| 6,028,917 A | * | 2/2000 | Creamer et al. | 379/100.01 |
| 6,185,604 B1 | * | 2/2001 | Sekiguchi | 709/206 |
| 6,230,189 B1 | * | 5/2001 | Sato et al. | 709/206 |
| 6,278,704 B1 | * | 8/2001 | Creamer et al. | 370/352 |
| 6,285,671 B1 | * | 9/2001 | Bossemeyer, Jr. et al. | 370/352 |
| 6,288,799 B1 | * | 9/2001 | Sekiguchi | 358/468 |
| 6,298,404 B1 | * | 10/2001 | Mishra | 710/100 |

* cited by examiner

Primary Examiner—Salvatore Cangialosi
(74) Attorney, Agent, or Firm—Cooper & Dunham LLP

(57) ABSTRACT

A communications terminal which is coupled to a local area network and a public switched telephone network includes a first communications device transmitting and receiving an image or a text through the local area network using a first communications procedure and a second communications device transmitting and receiving facsimile image through the public switched telephone network using a second communications procedure. The communications terminal further includes a controller and a memory. The controller performs an information relay operation for relaying an image, sent from a facsimile terminal, to a data terminal. The controller further performs another information relay operation for relaying an image or a text, sent from a data terminal, to a facsimile terminal. The memory stores a data base which cumulatively retains a plurality of communications history files associated with the respective information relay operations and a communications history report page including data of the communications history files of the data base. The controller controls to transfer the communications history report page of the first data base to a data terminal when the data terminal selects the communications history report page using a page browsing procedure.

48 Claims, 16 Drawing Sheets

Figure 3

ADDRESS CONVERSION TABLE — 21a

| SUB-ADDRESS | E-MAIL ADDRESS |
|---|---|
| 001 | Mori@abcd.vwxyz.co.jp |
| 002 | Watanabe@abcd.vwxyz.co.jp |
| 003 | Tanaka@abcd.vwxyz.co.jp |
| ... | ... |

Figure 6

| FILE IDENTIFICATION | FILE CONTENTS | |
|---|---|---|
| ⋮ | ⋮ | |
| /fax/report/970522.org | HISTORY FILE | 41 |
| /fax/report/970522.html | HISTORY REPORT IN HTML | 42 |
| ⋮ | ⋮ | |
| /fax/data/0010.tiff | LAN-TO-FAX IMAGE FILE | |
| /fax/data/0011.tiff | FAX-TO-LAN IMAGE FILE | |
| /fax/data/0012.tiff | NF-TO-FAX IMAGE FILE | |
| /fax/data/0013.tiff | FAX-TO-NF IMAGE FILE | |
| /fax/data/0014.txt | LAN-TO-FAX TEXT FILE | |
| ⋮ | ⋮ | 43 |
| /fax/data/0010.html | LAN-TO-FAX HTML IMAGE FILE | |
| /fax/data/0011.html | FAX-TO-LAN HTML IMAGE FILE | |
| /fax/data/0012.html | NF-TO-FAX HTML IMAGE FILE | |
| /fax/data/0013.html | FAX-TO-NF HTML IMAGE FILE | |
| /fax/data/0014.html | LAN-TO-FAX HTML TEXT FILE | |
| ⋮ | ⋮ | |

Figure 7

COMMUNICATIONS HISTORY INDICES — 41

| FILE NUMBER | DATE | START TIME | DESTINATION | MODE | TIME | PAGE | RESULT |
|---|---|---|---|---|---|---|---|
| ... | ... | ... | ... | ... | ... | ... | ... |
| 0010 | 97/05/22 | 09:05 | 1122223333 | G3 | 30 SEC | 2 SHEETS | OK |
| 0011 | 97/05/22 | 10:30 | 0123456789 | G3ECM | 60 SEC | 5 SHEETS | OK |
| ... | ... | ... | ... | ... | ... | ... | ... |

Figure 9

COMMUNICATIONS HISTORY INDICES

| FILE NO. | DATE | START TIME | DESTINATION | MODE | TIME | PAGE | RESULT |
|---|---|---|---|---|---|---|---|
| 0010 | 97/05/22 | 09:05 | 1122223333 | G3 | 30 SEC | 2 SHEETS | OK |
| 0011 | 97/05/22 | 10:30 | 0123456789 | G3ECM | 60 SEC | 5 SHEETS | OK |

| AUTHORIZED USERS LIST ||
|---|---|
| USER NAME | PASSWORD |
| mori | **** |
| tanaka | #### |
| ⋮ | ⋮ |

APPARATUS AND METHOD OF ALLOWING USER TO BROWSE HISTORY OF RELAY TRANSMISSION ON DATA TERMINAL

BACKGROUND

1. Field

The disclosed system and method relates to a network facsimile apparatus. More particularly, the disclosed system and method relates to a network facsimile apparatus which is capable of allowing users to browse a history of relay transmission on their data terminals.

2. Description of the Related Arts

There has been developed a so-called network facsimile machine that is capable of exchanging data (e.g. electronic mail) with other data terminals via a local area network (LAN) and the Internet, as well as exchanging facsimile data with other facsimile machines via a public switched telephone network (PSTN). Such a network facsimile machine is capable of transmitting image information to both users of data terminals (e.g. personal computers) on the local area network and of facsimile machines connected to the public switched telephone network. Also, the network facsimile machine may transmit image information to data terminals connected to other local area networks when the local area network of the network facsimile machine is connected to other local area networks through the Internet.

Moreover, users can transmit image information from a facsimile machine to data terminals on a local area network via the network facsimile machine. This function of the network facsimile machine may be referred to as an information relay function. The network facsimile machine can also relay information to other network facsimile machines across local area networks.

In the information relay operation, the network facsimile machine generally uses a sub-address signal (SUB) which is a control signal sent from the facsimile terminal. Sub-address is defined by the Group 3 facsimile protocol according to the recommendation T.30 of ITU-T (international telecommunication union-telecommunication). Each of the data terminals on a local area network is assigned a sub-address, so that any data terminal can be designated with the sub-address by a communications machine outside the local area network. In many cases, the network facsimile machine is provided with an address conversion table for converting a sub-address into an E-mail address.

When the relay transmission is requested by a data terminal in which a destination machine is a facsimile terminal, the data terminal writes a facsimile number in a header of E-mail. Thereby, the network facsimile machine can perform relay transmission by designating the destination facsimile terminal using the facsimile number provided.

Accordingly, users can greatly benefit from such convenient connections between networks of the facsimile machines and the data terminals by means of the network facsimile machine. However, the above-mentioned system has a lack of convenience in monitoring a history of relay transmission for operators at the data terminals. When an operator of a data terminal needs to check the request for relay transmission made yesterday, for example, the operator must go to the network facsimile machine because data in connection with the history of relay transmission is stored in the network facsimile machine.

It is believed that there is no system available that allows users to check the history of relay transmission at the data terminal without a journey to the network facsimile machine.

SUMMARY

The present application provides a communications terminal that can be coupled to a local area network and a public telephone network and that allows users to check the history of relay transmission at a data terminal without a journey to the communications terminal. In one embodiment, the communications terminal includes a first communications device, a second communications device, a controller, and a memory.

The first communications device transmits and receives image or text information through the local area network using a first predetermined communications procedure. The second communications device transmits and receives facsimile image information through the public switched telephone network using a second predetermined communications procedure. The controller performs an information relay operation for relaying image information, sent from a facsimile terminal, to a data terminal. The controller further performs another information relay operation for relaying image or text information, sent from a data terminal, to a facsimile terminal. The memory stores a first data base for communications history files, and a communications history report page. Preferably, the first data base cumulatively retains a plurality of communications history files associated with the respective information relay operations. The communications history report page preferably includes data of the communications history files.

The controller controls the first communications device to transfer the communications history report page of the first data base to a data terminal in response to a first event that the data terminal selects the communications history report page using a predetermined page browsing procedure.

The memory may further store a second data base for communications contents files. Preferably, the communications contents files in the data base are associated with the respective information relay operations. Preferably, each of the communications history files of the first data base included in the communications history report page is associated with the corresponding communications contents file of the second data base. The controller controls the first communications device to transfer the selected communications contents file of the second data base to a data terminal in response to a second event that the data terminal selects one of the communications contents files in the communications history report page using a predetermined page browsing procedure.

The memory may previously stores an authorized users list. If the authorized users list is previously stored in the memory, the controller can verify a user identification sent from the data terminal against the authorized users list and controls the first communications device to transfer the selected communications contents file of the second data base to the data terminal only when the user identification matches to data of the authorized users list, in response to the second event.

The memory may previously stores an authorized users list. If the authorized users list is previously stored in the memory, the controller can verify a user identification sent from the client data terminal against the authorized users list and transfers the communications history report page to the data terminal only when the user identification matches to data of the authorized users list, in response to the first event.

The communications history report page may be in accordance with a hyper text markup language (HTML).

The predetermined page browsing procedure may be in accordance with a hyper text transfer protocol (HTTP).

The first predetermined communications procedure may be a Group 3 facsimile procedure.

The second predetermined communications procedure may at least one of a simple mail transfer protocol (SMTP), a multipurpose Internet message extensions (MIME), and a file transfer protocol (FTP).

The present application also provides an electronic communications system which includes a plurality of facsimile terminals coupled to a public switched telephone network and a plurality of local area networks connected with each other. In one embodiment, each local area network includes a plurality of data terminals and a communications terminal which is coupled to the public switched telephone network.

In one embodiment, the communications terminal includes first and second communications devices, a controller, and a memory. The first communications device transmits and receives image or text information through the local area network using a first predetermined communications procedure. The second communications device transmits and receives facsimile image information through the public switched telephone network using a second predetermined communications procedure. The controller performs an information relay operation for relaying image information, sent from one of the plurality of facsimile terminals, to at least one of the plurality of data terminals. The controller further performs another information relay operation for relaying image or text information, sent from one of the plurality of data terminals, to at least one of the plurality of facsimile terminals. The memory stores a first data base for communications history files, and a communications history report page. Preferably, the first data base cumulatively retains a plurality of communications history files associated with the respective information relay operations. The communications history report page preferably includes data of the communications history files.

The controller controls the first communications device to transfer the communications history report page of the first data base to one of the plurality of data terminals in response to a first event that the above-mentioned one of the plurality of data terminals selects the communications history report page using a predetermined page browsing procedure.

The memory may further stores a second data base for communications contents files. Preferably, the communications contents files in the data base are associated with the respective information relay operations. Preferably, each of the communications history files of the first data base included in the communications history report page is associated with the corresponding communications contents file of the second data base. The controller controls the first communications device to transfer the selected communications contents file of the second data base to one of the plurality of data terminals in response to a second event that the above-mentioned one of the plurality of data terminals selects one of the communications contents files in the communications history report page using a predetermined page browsing procedure.

The memory may previously stores an authorized users list. If the authorized users list is previously stored in the memory, the controller can verify a user identification sent from the data terminal against the authorized users list and controls the first communications device to transfer the selected communications contents file of the second data base to the above-mentioned one of the plurality of data terminals only when the user identification matches to data of the authorized users list, in response to the second event.

The memory may previously stores an authorized users list. If the authorized users list is previously stored in the memory, the controller can verify a user identification sent from the client data terminal against the authorized users list and transfers the communications history report page to the above-mentioned one of the plurality of data terminals only when the user identification matches to data of the authorized users list, in response to the first event.

The communications history report page may be in accordance with a hyper text markup language (HTML).

The predetermined page browsing procedure may be in accordance with a hyper text transfer protocol (HTTP).

The first predetermined communications procedure may be Group 3 facsimile procedure.

The second predetermined communications procedure may be at least one of a simple mail transfer protocol (SMTP), a multipurpose Internet message extensions (MIME), and a file transfer protocol (FTP).

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 3 is an example of an address table provided to the network facsimile apparatus of FIG. 2;

FIG. 6 is a file list of a communications information file data base stored in a memory of the network facsimile apparatus of FIG. 2;

FIG. 7 is a diagram explaining the contents of a communications history file included in the communications information file data base of FIG. 6;

FIG. 9 is an illustration of a communications history report page in a hyper text markup language, in which the contents of the communications history file are imported;

FIG. 15 is an illustration explaining an authorized users list; and

DETAILED DESCRIPTION

Figure 1:
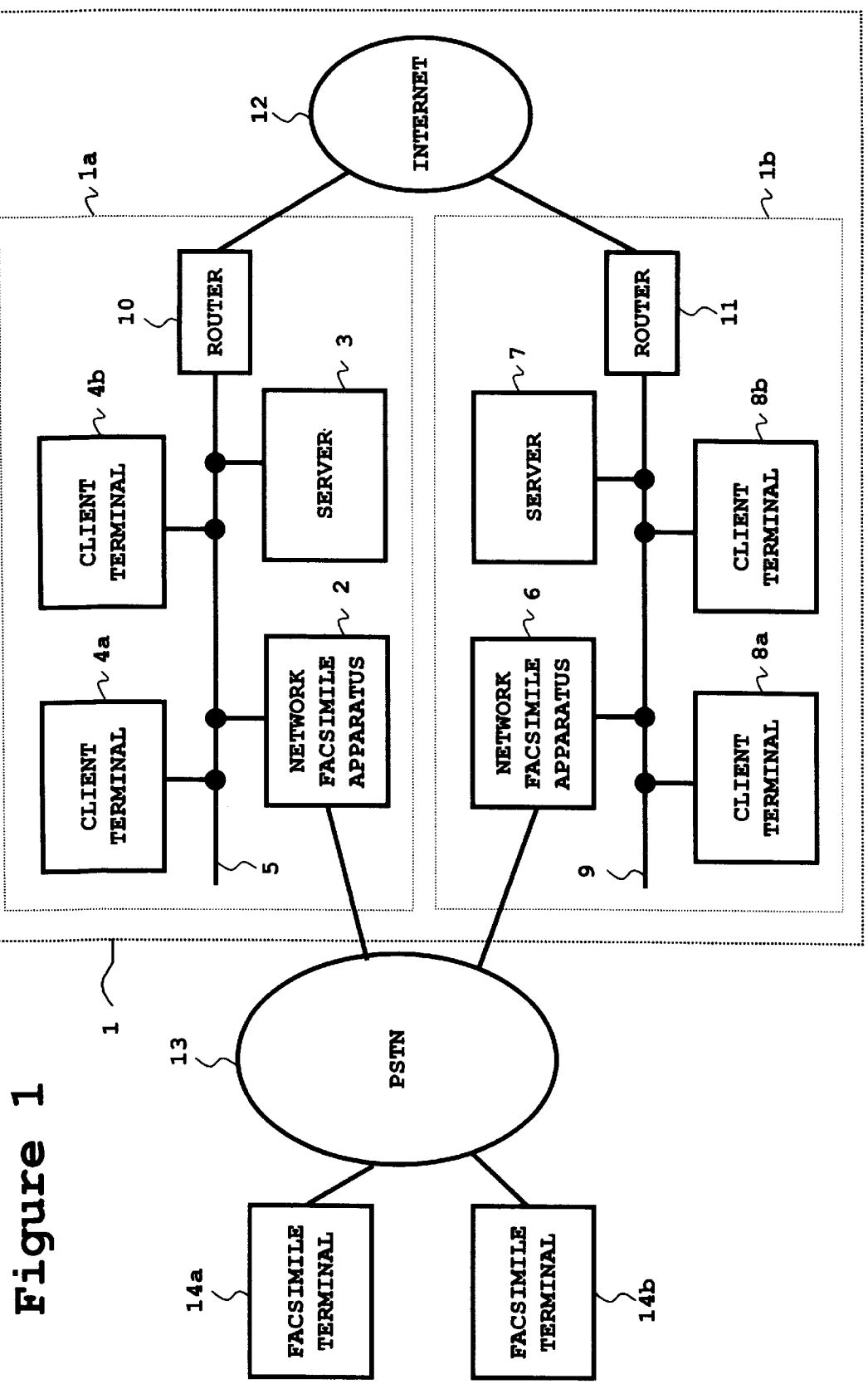
FIG. 1 is a block diagram of an electronic communications system including a network facsimile apparatus according to an embodiment of the present invention.

In describing preferred embodiments illustrated in the drawings, specific terminology is employed for the sake of clarity. However, the invention is not intended to be limited to the specific terminology so selected and it is to be understood that each specific element includes all technical equivalents which operate in a similar manner.

Referring now to the drawings, wherein like reference numerals designate identical or corresponding parts throughout the several views, FIG. 1 illustrates an exemplary electronic communications system including a communications network 1. The communications network 1 of FIG. 1 includes two local area networks (LANs) 1a and 1b, for example, which are operatively connected with each other through the Internet 12. The local area network (LAN) 1a includes a network facsimile apparatus 2, a server 3, client terminals 4a and 4b such as personal computers, a network facility 5, and a router 10. The network facility 5 provides bi-directional connections between the network facsimile apparatus 2, the server 3, the client terminals 4a and 4b, and the router 10. The local area network (LAN) 1b includes a network facsimile apparatus 6, a server 7, client terminals 8a and 8b such as personal computers, a network facility 9, and a router 11. The network facility 9 provides bi-directional connections between the network facsimile apparatus 6, the server 7, the client terminals 8a and 8b, and the router 11.

The electronic communications system of FIG. 1 further includes a public switched telephone network (PSTN) 13 and exemplary facsimile terminals 14a and 14b. The facsimile terminals 14a and 14b and the network facsimile apparatus 2 and 6 of the communications network 1 are connected to the PSTN 13. Preferably, each of the facsimile terminals 14a and 14b and the network facsimile apparatus 2 and 6 transmits and receives image information through a Group 3 facsimile communications procedure.

Each of client terminals 4a and 4b of the LAN 1a and the client terminals 8a and 8b of the LAN 1b has a communication feature compatible to the Ethernet for physical and data link layers and a TCP/IP (transmission control protocol/ Internet protocol) for network and transport layers. These client terminals 4a, 4b, 8a, and 8b can accordingly exchange data via the network facilities 5 and 9, the routers 10 and 11, and the Internet 12, through operations by various kinds of application programs. These application programs may be used for exchanging text-based electronic mail (hereinafter referred to as E-mail) under an SMTP (simple mail transfer protocol), or non-text data such as image or voice data under a MIME (multipurpose Internet message extensions), or file data under a FTP (file transfer protocol).

In each of the LAN 1a and 1b, a POP (post office protocol) is applied; the server 3, for example, operates as a POP server, and the client terminals 4a and 4b and the network facsimile apparatus 2, for example, operate as POP clients. Under the POP protocol, the POP server 3, for example, receives E-mails sent from inside or outside of the local area network and holds any E-mails addressed to the POP clients such as the client terminals 4a and 4b and the network facsimile apparatus 2. Then, at a predetermined timing, the POP server 3 delivers the E-mail to the addressed client terminal among the client terminals 4a and 4b and the network facsimile apparatus 2.

Each of the client terminals 4a, 4b, 8a, and 8b is provided with an Internet home page browser (application software) communicable to an HTTP (hyper text transfer protocol) protocol so as to be operable as an HTTP client. Accordingly, each of the client terminals 4a, 4b, 8a, and 8b is capable of accessing HTTP servers (not shown) on the communications network 1 in order to browse and obtain page information stored therein, by the communications on the TCP (transmission control protocol) in accordance with the protocol of HTTP.

Since the network facsimile apparatuses 2 and 6 have the same configuration in the hardware and software, both apparatuses are capable of performing the same functions in the same manner. Accordingly, it is understood throughout the present specification that when the description below refers to only one of the apparatuses for the sake of simplicity, such description applies to both apparatuses. This applies to the LANs 1a and 1b, the server 3 and 7, the client terminals 4a, 4b, 8a, and 8b, the router 10 and 11, and the facsimile terminals 14a and 14b.

Figure 2:
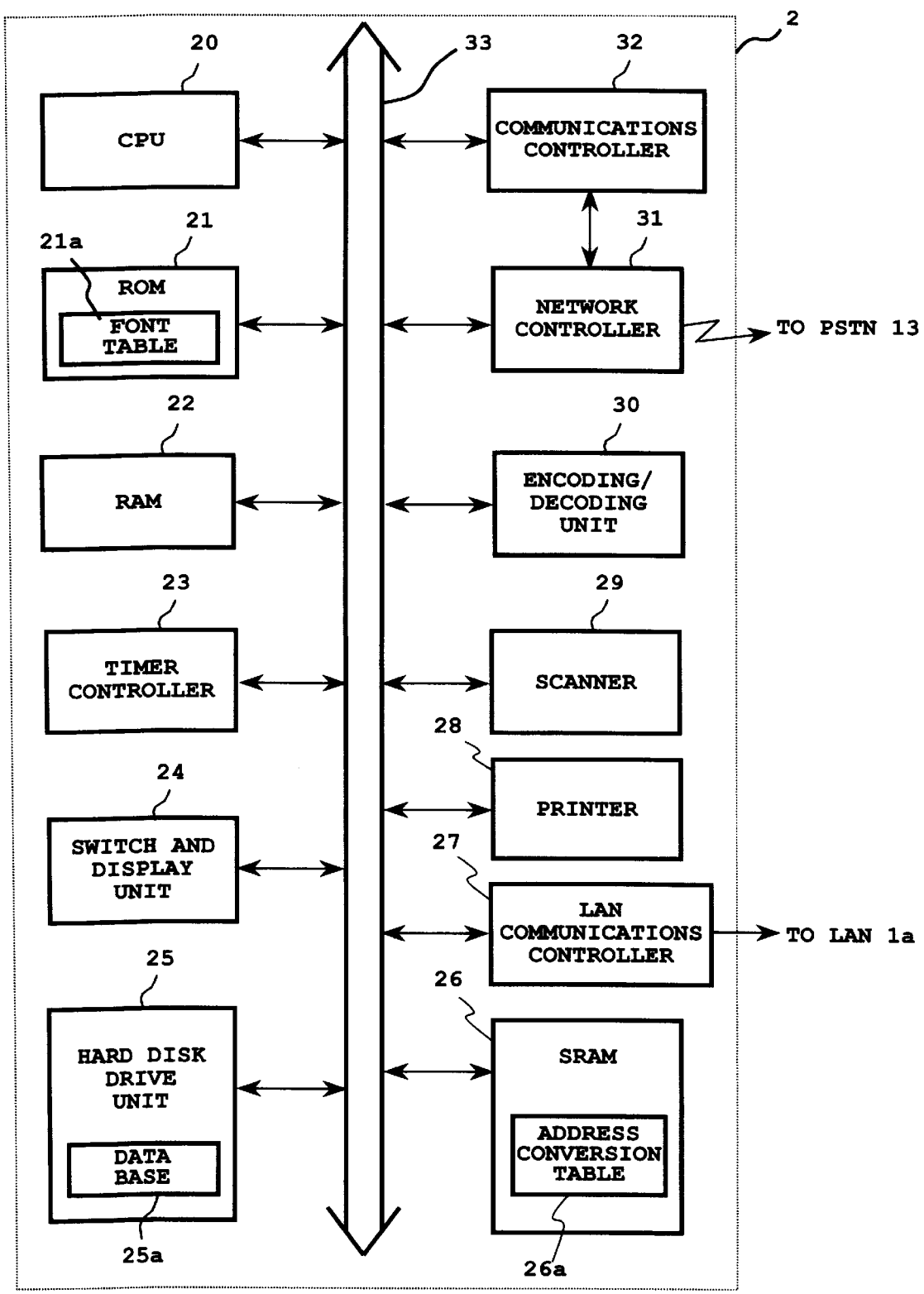
FIG. 2 is a block diagram of the network facsimile apparatus included in the electronic communications system of FIG. 1.

Next, an exemplary structure of the network facsimile apparatus 2 is explained with reference to FIG. 2. The network facsimile apparatus 2 includes a CPU (central processing unit) 20, a ROM (read only memory) 21, a RAM (random access memory) 22, a timer controller 23, a switch/ display unit 24, a hard disk drive unit 25, and an SRAM (static random access memory) 26. The network facsimile apparatus 2 further includes a LAN (local area network) communications controller 27, a printer 28, a scanner 29, an encoding/decoding unit 30, a network controller 31, a communications controller 32, and a system bus 33.

The CPU 20 controls the entire operation of the network facsimile apparatus 2, in accordance with control programs stored in the ROM 21 and using a memory region of the RAM 22 as a data handling space. The ROM 21 stores the control programs to be performed by the CPU 20, and various kinds of data including information specific to the network facsimile apparatus 2 and necessary for the execution of the control programs. The ROM 21 includes a font table 21a for storing information of various character codes and the corresponding font data. The CPU 20 accesses the font table 21a in order to refer to the properties of character codes when executing a character-to-image conversion. The RAM 22 includes a memory region which is used as a data handling space for the CPU 1.

The timer controller 23 operates as a clock to maintain the real time including date and as a time counter to count various time periods in order to control time used in the network facsimile apparatus 2. Operating as the time counter, the timer 23 can detect an elapsed-time and send an interruption signal to the CPU 1 upon such a detection.

The switch and display unit 24 includes various kinds of operational keys (not shown) and indicators (not shown) for interfacing between an operator and the network facsimile apparatus 2. The operational keys include, for example, a numeric keypad for entering the numbers such as a facsimile number of a destination facsimile terminal, a start key for sending an instruction for starting transmission, and a stop key for sending an instruction for stopping an operation. Further, the operational keys include a single-touch-dialing mode key for changing a dialing mode from an ordinary dialing mode to a single-touch-dialing mode in which an operator can designate a registered destination facsimile number by pressing only a specified key. Further, the operational keys include a short-cut-dialing mode key for changing the dialing mode into a short-cut-dialing mode so as to make use of a dialing a short-cut-number pertinent to a registered destination facsimile terminal. The indicator of the switch and display unit 24 includes, for example, an LCD (liquid crystal display) for displaying various kind of status information and messages for the operator.

The hard disk drive unit 25 includes a communications information file data base 25a, explained later. The hard disk drive unit 25 stores image information through various communications operations. One example of image information that can be stored is the image information read by the scanner 29. Another example is the image information which is received from other facsimile terminals or data terminals and stored until the printer 28 can reproduce the image information on a recording sheet. Another example is the image information to be transmitted to or which has been received via the communications network 1. The SRAM 26 which is provided with a backup battery (not shown) retains important information such as machine data and user data in the event of a power off and a power failure. The SRAM 26 includes an address conversion table 26a, later explained.

The LAN communications controller 27 is connected to the network facility 5, and responsive to the Ethernet for the physical and data link layers and to the TCP/IP protocol for the network and transport layers. The LAN communications controller 27 performs data transmission operations. For example, the LAN communications controller 27 receives data from the CPU 20 and transmits the data to the communications network 1 through the communications on the TCP/IP. Also, the LAN communications controller 27 receives data from the communications network 1 through the communications on the TCP/IP and transmits the data to the CPU 20.

The printer 28 produces an image output at a predetermined line density in accordance with the image information, which is transmitted from an external machine such as a facsimile terminal, a different network facsimile apparatus, or a client terminal or which is read by the scanner 29. The scanner 29 reads an image of a document at a selected line density (resolution) from among the predetermined line densities (resolution) including 3.85 lines per mm, 7.7 lines per mm, and 15.4 lines per mm, for example.

The encoding/decoding unit 30 compresses image information which is to be transmitted, with a predetermined encoding method, and decompresses image information which is received, with a predetermined decoding method corresponding to the predetermined encoding method. The encoding/decoding methods used by the encoding/decoding unit 30 conform to the Group 3 facsimile communications procedure and may be an MH (modified huffman) method, an MR (modified READ (relative element address designate)) method, an MMR (modified modified READ (relative element address designate)) method, or the like.

The network controller 31 is operatively connected to the PSTN 13 and controls the line connection of the network facsimile apparatus 2. Specifically, the network controller 31 connects and disconnects the line through which the direct current forms a loop when the line is connected. Also, the network controller 31 detects various events such as an inverse of the line polarity, disconnection of the line, a dial tone, a busy (speech) tone, a calling signal, and so forth. Further, the network controller 31 generates dialing pulses in accordance with the facsimile numbers entered through the switch and display unit 24.

The communications controller 32 performs a facsimile communications operation in accordance with a facsimile communications protocol, preferably a Group 3 facsimile communications protocol. The communications controller 32 includes a facsimile modem function which preferably conforms to a Group 3 facsimile communications procedure so as to modulate transmission data to the PSTN 13 via the network controller 31 and to demodulate the received signal from the PSTN 13 through the network controller 31. Further, the communications controller 32 sends a DTMF (dial tone multi-frequency) signal which corresponds to the facsimile number entered. The system bus 33 provides connections between the above-described units of the network facsimile apparatus 2 so that these units can communicate with each other.

In the way as described above, one of the preferred configurations is provided to the network facsimile apparatus 2 of the LAN 1a. The network facsimile apparatus 6 of the LAN 1b is also provided with a similar configuration.

Next, a description is provided for general operations of the network facsimile apparatus 2 and 6, wherein the LANs 1a and 1b are assumed to be located apart from each other; the LAN 1a is in Japan, for example, and the LAN 1b in a different country, the United States, for example. It is also assumed that the PSTN 13 is a worldwide scale telephone network and that the facsimile terminal 14a is located at a LAN 1a side in Japan and the facsimile terminal 14b is located at a LAN 1b side in the United States.

In such an environment, a new facsimile transmission way may become possible using the LAN communications function and the facsimile communications functions of the network facsimile apparatus 2 and 6. For example, when the facsimile terminal 14a in Japan transmits image information to the facsimile terminal 14b in the United States, the network facsimile apparatus 2 and 6 can relay the image information to the facsimile terminal 14b. Such relay is made via the network facility 5, the router 10, the Internet 12, the router 11, the network facility 9, the network facsimile apparatus 6, and the PSTN 13. In contrast to this relay method, the conventional method transmits image information all the way from Japan to the United States along the costly PSTN 13. Accordingly, in accordance with the present invention, image information can be transmitted from Japan to the United States at an extremely lower transmission cost relative to the conventional way, using the network facsimile apparatuses 2 and 6 via the Internet 12.

There are other cases where the network facsimile apparatuses 2 and 6 can assist to transmit image information at an extremely low cost. For example, the client terminals 4a and 4b in Japan can send image information to the facsimile terminal 14b in the United States via the Internet using the network facsimile apparatuses 2 and 6. For another example, the network facsimile apparatus 2 can send image information of a document read by itself to the facsimile terminal 14b in the United States via the Internet 12 using the network facsimile apparatus 6. Moreover, image information from the Japan side can be addressed also to the network facsimile apparatus 6 or the client terminals 8a and 8b.

In the above-described operation for transmitting image information, the network facsimile apparatus 2 encodes the image information into text data in a format conforming to a MIME (multi-purpose Internet mail extensions) so as to generate E-mail. The E-mail is then transmitted to the network facsimile apparatus 6 via the Internet 12. Upon receiving the E-mail, the network facsimile apparatus 6 decodes the contents of the E-mail into the original image information. Unless the network facsimile apparatus 6 is a final addressee of the E-mail, the network facsimile apparatus 6 delivers the image information to a destination machine, or the facsimile terminal 14b or the client terminal 8a or 8b. When the network facsimile apparatus 6 is a final addressee of the E-mail, the network facsimile apparatus 6 reproduces the image information on a recording sheet.

The advantages in the transmission cost described above can also be made possible even when the facsimile terminals 14a and 14b and the LAN 1a and 1b are apart from each other but located in one country, for example, Japan.

When the facsimile terminal 14a or 14b sends image information to a destination machine which is, for example, one of the client terminals on the communications network 1, the facsimile terminal 14a or 14b needs to send the image information with an attachment including address information that specifies an address of the destination machine. Upon receiving the image information with the attachment of address information from the facsimile terminal 14a or 14b, the network facsimile apparatus 2 or 6 delivers the image information to an appropriate destination machine based on the address information attached to the image information.

One practical way for specifying such a destination machine is to use a sub-address signal (SUB). The sub-address signal (SUB) is a control signal for identifying a sub-address that is used in a relay facsimile transmission procedure as defined by the Group 3 facsimile communications procedure in accordance with T.30 of ITU-T (international telecommunication union-telecommunication) recommendation.

In the relay facsimile transmission procedure, a facsimile terminal (e.g. facsimile terminal 14a) can send image information to a data terminal (e.g. client terminal 4a) on a local area network via a relay facsimile terminal (e.g. network facsimile apparatus 2). More specifically, in the electronic communications system of FIG. 1, the facsimile terminal 14a, for example, first sends image information, under a relay transmission request mode, to the network facsimile apparatus 2 that has a connection to a local area network where a destination machine, or the client terminal 4a, for example, is situated. At this time, the facsimile terminal 14a sends the sub-address signal (SUB) that represents an identification of the destination machine, to the network facsimile apparatus 2 together with the image information. Upon receiving the image information with the sub-address signal (SUB), the network facsimile apparatus 2 converts the sub-address signal (SUB) into E-mail address information and also converts the received image information into a MIME-format E-mail. Then, the network facsimile apparatus 2 sends the MIME-format E-mail to the client terminal 4a using the E-mail address.

The network facsimile apparatuses 2 and 6 use the address conversion table 26a of FIG. 3 for the purpose of converting the information of the sub-address signal (SUB) into E-mail address information. As shown in FIG. 3, the address conversion table 26a includes a plurality of pairs of a sub-address (e.g. 0001) and the corresponding E-mail address (e.g. mori@abcd.vwxyz.co.jp). Users may register to the address conversion table 26a of the network facsimile 2, for example, directly on the network facsimile apparatus 2 through the switch and display unit 24 thereof, or on the client terminals 4a or 4b or the server 5 of the LAN 1a using an appropriate application software for handling such table 26a.

The above-described address conversion table 26a is needed because the E-mail addresses are normally composed of alphanumeric characters while the sub-address signal (SUB) can contain only information of numbers and limited symbols.

As an alternative way for the address conversion table 26a, a direct designation of a destination machine may be possible on the facsimile terminal 14a or 14b. In this alternative way, an E-mail address entered on the facsimile terminal 14a or 14b is contained in an information field such as an NSS (non-standard-facilities setup) signal in the Group 3 facsimile communications procedure.

Figure 4:
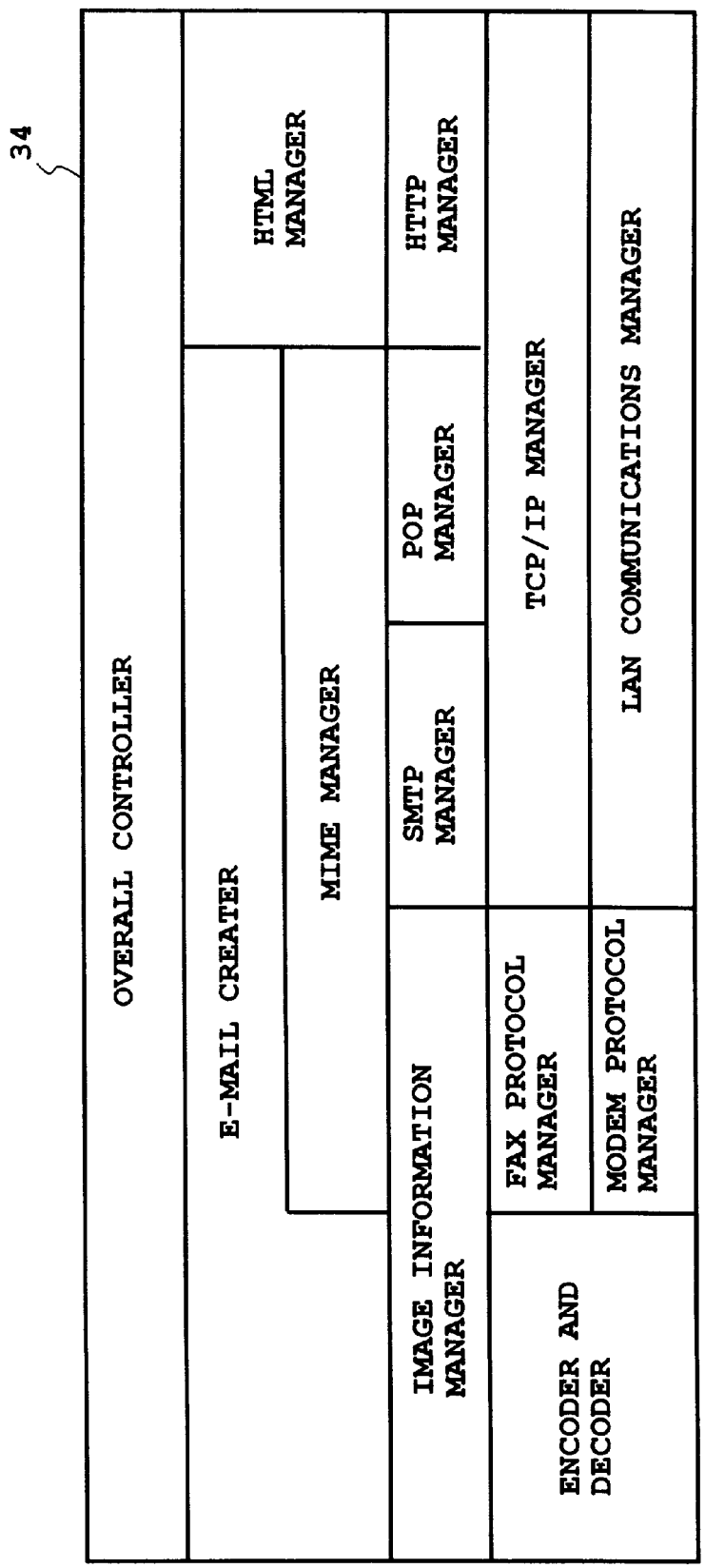
FIG. 4 is a diagram explaining an exemplary configuration of software programs used in the network facsimile apparatus of FIG. 2.

Next, an exemplary software configuration of the network facsimile apparatuses 2 and 6 will be explained with respect to FIG. 4. The network facsimile apparatuses 2 and 6 are provided with a software system 34 including a plurality of software programs. An exemplary configuration of the software system 34 is illustrated in FIG. 4. As indicated by the thick lines in FIG. 4, main programs of the software system 34 are two protocol stacks, a FAX protocol manager for controlling the facsimile communication via the PSTN 13 and a TCP/IP (transmission control protocol/Internet protocol) manager for controlling the data communication via the network facility 5.

The FAX protocol manager of FIG. 4 is a facsimile communications control program, used by the communications controller 32, for controlling the facsimile communications procedures in accordance with the Group 3 facsimile protocols conforming to the T-30 recommendations of the ITU-T. A MODEM (modulator-demodulator) manager is a data modulation and demodulation control program, also used by the communications controller 32, for transmitting and receiving facsimile data via the PSTN 13. Encoder and decoder are data encoding and decoding programs, used by the encoding/decoding unit 30 for compressing and decompressing image information according to the T-4 recommendations of the ITU-T.

An image information manager is a program used by the CPU 20 for storing image information. The TCP/IP manager is a data communications control program, used by the LAN communications controller 27, for controlling the data communications procedures via the network facility 5 according to the TCP/IP. A LAN (local area network) communications manager is a program, also used by the communications controller 32, for transmitting and receiving data through the network facility 5.

A MIME (multi-purpose Internet mail extensions) manager is a data conversion program according to the MIME, used by the CPU 20, for encoding data such as binary image data into text data for E-mail and for decoding E-mail text data back to original data. An SMTP (simple mail transfer protocol) manager is a simple mail transfer program according to the SMTP, used by the CPU 20, for transferring E-mail by the TCP/IP communications through the network facility 5, with which the network facsimile apparatus 2 can transfer image information to the client terminals on the communications network 1. An E-mail creator is a program used by the CPU 20 for creating E-mail by creating and adding a mail header in accordance with the SMTP and MIME to the contents and which are composed of ordinary text data and/or text data encoded from image information with the MIME manager.

A POP (post office protocol) manager is a mail receiving program according to the POP, used by the CPU 20, for regularly accessing the POP server 3, and obtaining E-mails when the POP server 3 stores any E-mail in a mail box thereof assigned for the network facsimile apparatus 2. An HTTP (hyper text transfer protocol) manager is a hyper text transfer program according to the HTTP, used by the CPU 20, for transferring information in the HTML (hyper text markup language) format, which is used in the home page browsing services available through the communications network 1.

An HTML (hyper text markup language) converter is a text conversion program according to the HTML, used by the CPU 20, for converting data, such as a communications history report (explained later) which is transferred by the HTTP (hyper text transfer protocol) communications, using the HTML (hyper text markup language) format. An overall controller is a program, used by the CPU 20, for operatively integrating the operations performed by the above-described programs and controlling a user interface through the switch and display unit 24.

Next, an exemplary HTTP communication sequence performed when the client terminal browses page information in the HTML format stored in the network facsimile apparatus 2 will be explained with reference to FIG. 5. In this sequence, a communications history report (explained later) is browsed as an example of the page information in the HTML format. The hyper text transfer protocol (HTTP) is an easy-to-use and flexible client/server protocol, and is designed to maintain no communication state so as to perform a relatively simple and high speed communication operation.

Figure 5:
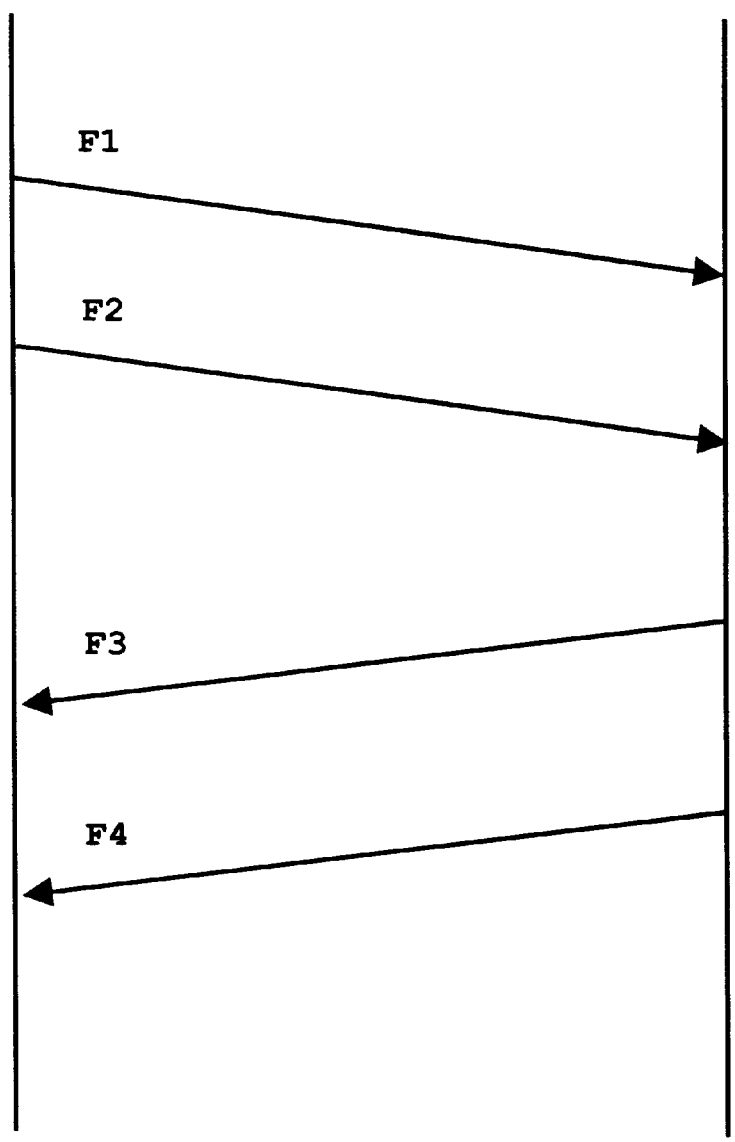
FIG. 5 is a diagram of an exemplary communications sequence for a file transfer operation performed between a client terminal and the network facsimile apparatus of FIG. 2.

As shown in Phase F1 of FIG. 5, the client terminal 4a, for example, as an HTTP client sends a request for connection to the network facsimile apparatus 2 as an HTTP server. In response to the request, the network facsimile apparatus 2 establishes a connection with the client terminal 4a. In Phase F2, the client terminal 4a sends a URL (uniform resource locator) request for transferring an HTML file (GET/tax/report/970522.html) to the network facsimile apparatus 2. In Phase F3, the network facsimile apparatus 2 transfers the HTML file (970522.html) to the client terminal 4a. In Phase F4, the network facsimile apparatus 2 sends a disconnection request to the client terminal 4a.

In Phase F2 of the above-described sequence, the client terminal 4a designates a URL transfer file by "GET" of an HTTP method. The URL is "fax/report/970522.html." In response, the network facsimile apparatus 2 sends the HTML file "970522.html," a communications history report written in the HTML language, to the client terminal 4a.

Next, an exemplary communications data base which is stored in the hard disk drive unit 25 will be explained with reference to FIG. 6. As described above, the network facsimile apparatus 2 performs the various communications operations via the PSTN 13 using its information transfer function from the communications network 1 to the PSTN 13, and vice versa. In one exemplary operation, the network facsimile apparatus 2 reads an image of a document by the scanner 29 and stores the image into the hard disk drive unit 25. The image stored in the hard disk drive unit 25 is referred to as an NF-to-FAX (network facsimile to facsimile) image file. Then, the apparatus 2 sends a call to a destination facsimile terminal (e.g. the facsimile terminal 14a) on the PSTN 13, designated through the switch and display unit 24. The apparatus 2 then reads the NF-to-FAX image file from the hard disk drive unit 25 and transfers the file as a facsimile message to the destination facsimile terminal (e.g. the facsimile terminal 14a) in accordance with the Group 3 facsimile protocol.

In another exemplary operation, the network facsimile apparatus 2 receives a facsimile message from a sending facsimile terminal (e.g. the facsimile terminal 14a) in accordance with the Group 3 facsimile protocol and stores the message into the hard disk drive unit 25. The message stored in the hard disk drive unit 25 is referred to as a FAX-to-NF (facsimile to network facsimile) image file. After completing the communications operation, the network facsimile apparatus 2 reads the FAX-to-NF image file from the hard disk drive unit 25 and records the file on a recording sheet with the printer 28.

In another exemplary operation, the network facsimile apparatus 2 receives a transfer request E-mail of which contents include image information or text information, from a client terminal (e.g. the client terminal 4a). When receiving a transfer request E-mail of which contents include image information, the apparatus 2 extracts the original image information from the E-mail contents and stores the information into the hard disk drive unit 25. When receiving a transfer request E-mail of which contents includes text information, the apparatus 2 extracts the text information from the E-mail contents, converts the extracted information into original image information, and stores the information as a transfer request image file into the hard disk drive unit 25. In both cases, the information stored in the hard disk drive unit 25 is referred to as a LAN-to-FAX (local area network to facsimile) image file. Then, in both cases, the apparatus 2 sends a call to a destination facsimile terminal (e.g. the facsimile terminal 14a) on the PSTN 13, which terminal is designated by the number given in a "TO" field of the E-mail header. The apparatus 2 reads the LAN-to-FAX image file from the hard disk drive unit 25 and transfers the file as a facsimile message to the destination facsimile terminal (e.g. the facsimile terminal 14a) in accordance with the Group 3 facsimile protocol.

In another exemplary operation, the network facsimile apparatus 2 receives a facsimile message with the sub-address signal (SUB) for notifying a sub-address of a destination client terminal (e.g. the client terminal 4a) from a sending facsimile terminal (e.g. the facsimile terminal 14a) in accordance with the Group 3 facsimile protocol. The apparatus 2 stores the message into the hard disk drive unit 25. The message stored in the hard disk drive unit 25 is referred to as a FAX-to-LAN (facsimile to local area network) image file. After completing the communications operation, the network facsimile apparatus 2 reads the FAX-to-LAN image file from the hard disk drive unit 25 and converts the sub-address into an E-mail address using the address conversion table 26a. Then, the apparatus 2 transfers the image file as E-mail to the destination client terminal (e.g. the client terminal 4a).

In the above-described operations, a plurality of files are generated and accumulated, in sequence, in the hard disk drive unit 25. These files are formed as the communications file data base 25a. FIG. 6 shows the contents of the data base 25a stored in the hard disk drive unit 25, indicating a plurality of pairs of a file number and a description of the corresponding file contents. As shown in FIG. 6, the communications file data base 25a includes a communications history file 41, a communications history report 42, and a plurality of image/text information files 43.

The communications history file 41 of FIG. 6 is one example and has a file name "970522.org" registered under a directory "/fax/report/" which is organized based on a predetermined route directory. The history file 41 is a record of the above-described information transfer operations performed by the network facsimile apparatus 2. The "970522" of the history file 41's file name indicates that the plurality of image and/or text information files 43 are generated during the information transfer operations performed in a day of May 22, 1997, for example.

The communications history report 42 has a file name "970522.html," as shown in FIG. 6. The history report 42 is converted from the communications history file 41 using the HTML conversion and placed in the same directory "/fax/report/" for the communications history file 41 of "970522.org."

As shown in FIG. 6, the plurality of image/text information files 43 includes two file groups. The first file group includes the aforementioned image files such as the LAN-to-FAX image file, the FAX-to-LAN image file, the NF-to-FAX image file, and the FAX-to-NF image file. These image files are generated when the network facsimile apparatus 2 performs the information transfer operations, as described above. Each of these image files is provided with a file name with an extension "tiff," which may be replaced with an alternative extension "GIF," and registered in the directory "/fax/data/." The first group of the image/text information files 43 also includes an exemplary text information file (referred to as a LAN-to-FAX text file), which has a file name with an extension "txt" and is registered in the same directory "/fax/data/." The second file group includes a plurality of HTML files such as a LAN-to-FAX HTML image file, a FAX-to-LAN HTML image file, an NF-to-FAX HTML image file, a FAX-to-NF HTML image file, and a LAN-to-FAX HTML text file. These HTML files are generated based on the files of the first group.

A file name which is assigned to each of the image/text information files 43 has four digits, for example, varying from "0000" to "9999", and is followed by an extension "tiff" or "txt." Accordingly, each of the information transfer operations can be identified with the file name, or the number composed of four digits. Thus, the above-described files of the first group, the LAN-to-FAX image file, the FAX-to-LAN image file, the NF-to-FAX image file, the FAX-to-NF image file, and the LAN-to-FAX text file, are assigned exemplary file names such as "0010.tiff," "0011.tiff," "0012.tiff," "0013.tiff," "0014.txt," respectively, as shown in FIG. 6.

As described above, an HTML file is generated based on an image information file with "tiff" and a text information file with "txt." The HTML file is assigned the same file name as is assigned to the corresponding "tiff" or "txt" file. Such a file name is followed by an extension "html." The thus-generated HTML file is stored in the same directory "/fax/data/" where the corresponding "tiff" or "txt" file is registered. More specifically, the LAN-to-FAX HTML image file "0010.html" is generated based on the LAN-to-FAX image file "0010.tiff." The FAX-to-LAN HTML image file "0011.html" is generated based on the FAX-to-LAN image file "0011.tiff." The NF-to-FAX HTML image file "0012.html" is generated based on the NF-to-FAX image file "0012.tiff." The FAX-to-NF HTML image file "0013.html" is generated based on the FAX-to-NF image file "0013.tiff." The LAN-to-FAX HTML text file "0014.html" is generated based on the LAN-to-FAX "0013.txt."

Next, exemplary contents of the communications history file 41 are explained with reference to FIG. 7. The exemplary communications history file 41 having the file name "970522.org" is registered in the directory "/fax/report/" of the hard disk drive unit 25. As shown in FIG. 7, the exemplary communications history file 41 includes a plurality of rows, each including a file number and a plurality of information transfer operation indices.

The plurality of information transfer operation indices include a date for representing a date on which the operation is performed, a start time for representing a time when the operation is started, and a destination for representing a calling number of a destination machine. The destination can be obtained from the "To" field of the E-mail header, or a CSI (called station identification) or CIG (calling subscriber identification) signal according to the Group 3 facsimile protocol. The information transfer operation indices further includes a mode for representing a communications mode that has been selected for the operation. One exemplary communication mode is a G3 for indicating that the operation is performed in accordance with the Group 3 facsimile protocol. Another exemplary communication mode is a G3ECM (group 3 error correcting mode) indicating that the operation is performed in accordance with the Group 3 facsimile protocol with the ECM function.

The information transfer operation indices further includes a time for representing a communication time in seconds, for example, pages for representing numbers of pages which have been transferred, and a result for representing a communication result with an "OK" mark for a normal completion or a "NG" mark for an abnormal completion.

Figure 8:
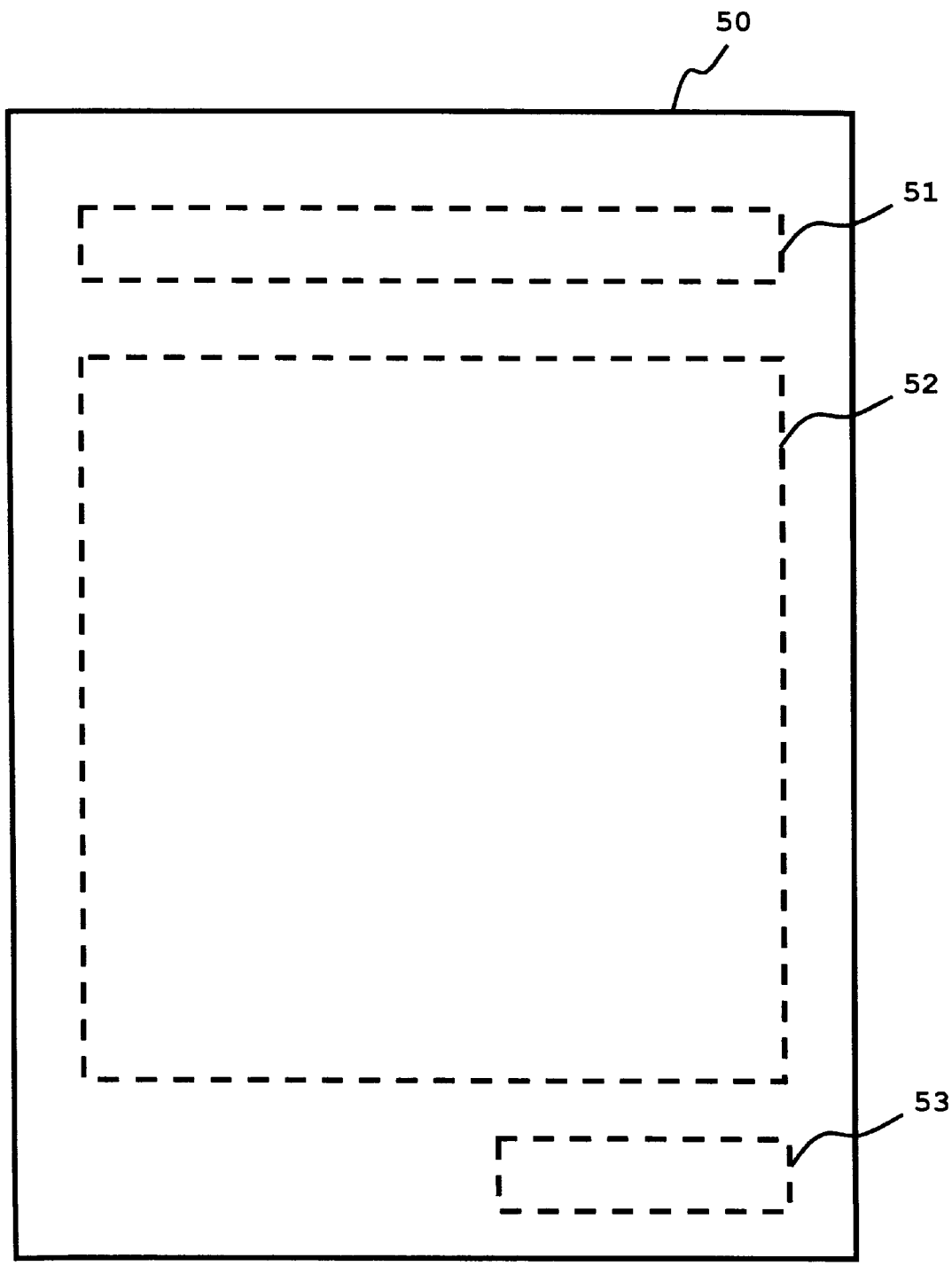
FIG. 8 is an illustration of a page image in a hyper text markup language, in which image or text information that has been transferred is imported.

Next, an exemplary page configuration of the image or text information file formed in the HTML format will be explained with reference to FIG. 8. FIG. 8 illustrates an exemplary HTML page 50 which is a display page image of a file "????.html" registered in the directory "/fax/data/" of the communications information file data base 25a. The number "????" of the file name is an arbitrary number among the numbers from "0000" to "9999."

In FIG. 8, the HTML page 50 includes a title block 51, an image/text information block 52, and a "return-to" block 53. In the image/text information block 52, image information appears as an in-line image and text information is directly implanted. This in-line image information is the information of the file "????.tiff" which corresponds to the HTML file "????.html" designated by the IMG tag of the HTML and is located in the directory "/fax/data/." The text information is the information of the file "????.txt" which corresponds to the HTML file "????.html" and is located in the directory "/fax/data/." The "return-to" block 53 is linked to the communications history report 52 (file name "970522.html"), the HTML file, in the directory "/fax/report/" by an option HREF of an anchor tag A defined by the HTML.

Next, an exemplary display image of the communications history report 42 is explained with reference to FIG. 9. The report image 60 of FIG. 9 includes various history data items which correspond to the plurality of communications history indices included in the communications history report 42 of FIG. 7. Data in the destination column, which are underlined, are linked to the HTML file "????.html" in the directory "/fax/data/" by the option HREF of the anchor tag A of the HTML. Any data field other than the destination may be linked to the "????.html."

Accordingly, when the report image 60 of FIG. 9 is displayed and one of the destinations indicated in the destination column is selected on the report image 60, the corresponding HTML page 50 of FIG. 8 is selected and the display turns to the corresponding HTML page 50. Then, when the "return-to" block 53 is selected on the HTML page 50, the display returns to the report image 60.

Figure 10:
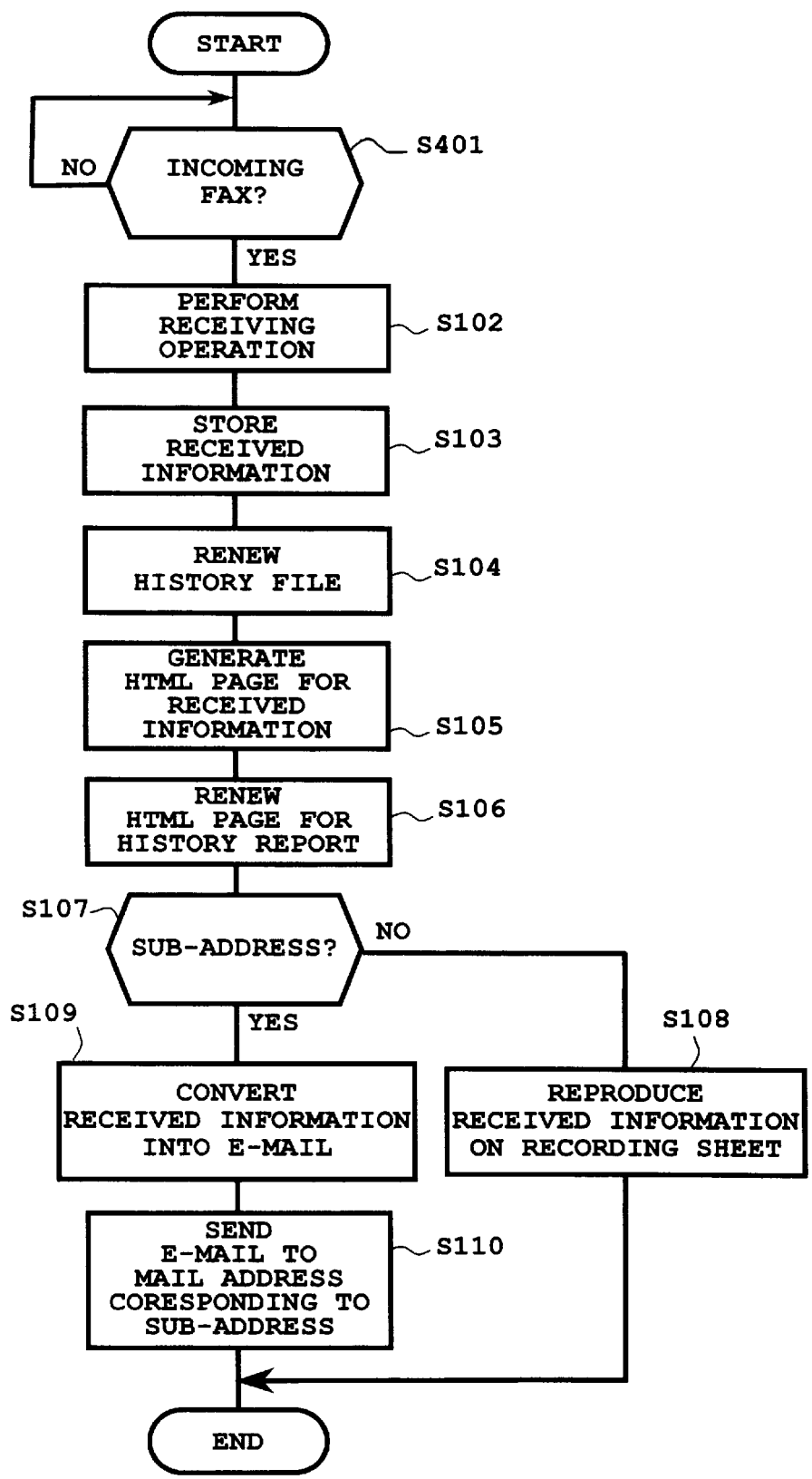
FIG. 10 is a flowchart explaining an exemplary procedure of the network facsimile apparatus of FIG. 2 for transferring facsimile information to a client data terminal.

Next, an exemplary information transfer operation of the network facsimile apparatus 2 is explained with reference to FIG. 10. In this case, the network facsimile apparatus 2 handles the FAX-to-LAN image file. In FIG. 10, the CPU 20 of the network facsimile apparatus 2 checks an incoming call via the PSTN 13 in Step S101. The check is continued by the NO loop of Step S101 until an incoming call via the PSTN 13 is detected. When an incoming call via the PSTN 13 is detected and the check result of Step S101 is YES, the facsimile receiving operation is performed in accordance with the Group 3 facsimile protocol, in Step S102.

After the facsimile receiving operation, the received image information is stored as a FAX-to-LAN image file (file name "????.tiff"), a TIFF file, in the communications information file data base 25a, in Step S103. Then, in Step S104, the communications history file 41 (file name "970522.org") is updated with the result of the facsimile receiving operation which has been performed in Step S102. In this process of Step S104, the FAX-to-LAN image file (file name "????.tiff"), associated with the result of the facsimile receiving operation performed in Step S102, is added as a new record in the communication history file 41.

Then, in Step S105, an HTML file having a file name "????.html" is generated based on the FAX-to-LAN image file (file name "????.tiff") and stored in the communication information file data base 25a. As shown in FIG. 8, an HTML page can be generated using the information for the file number "????" in the communications history file 41, the file name "970522.html" of the communications history report 42, the file name "????.tiff" of the FAX-to-LAN image file (file name "????.tiff"), and so forth. Then, in Step S106, the communications history report 42 (file name "970522.html") is renewed based on the communications history file 41 (file name "970522.org") which is renewed in Step S104 and the HTML file names corresponding to the plurality of image and text information files registered in the communications history file 41.

Then, in Step S107, the CPU 20 checks for receipt of a sub-address by the sub-address signal (SUB) during the facsimile receiving operation performed in Step S102. If the CPU 20 detects no receipt of a sub-address and the check result of Step S107 is NO, the CPU 20 instructs the printer 28 to reproduce the received image information on a recording sheet in Step S108. In this case, the received image information which is stored in the communications information file data base 25a is regarded as a FAX-to-NF image file, as described above with reference to FIG. 6. If the CPU 20 detects a receipt of a sub-address and the check result of Step S107 is YES, the CPU 20 converts the received image information into an E-mail in accordance with the MIME in Step S109. In this case, the received image information which is stored in the communications information file data base 25a is regarded as a FAX-to-LAN image file, as described above with reference to FIG. 6. Then, in Step S110, the CPU 20 refers to the address conversion table 26a to determine an E-mail address corresponding to the informed sub-address, and transfers the E-mail to the destination machine using the determined E-mail address. Then, the process ends.

Figure 11:
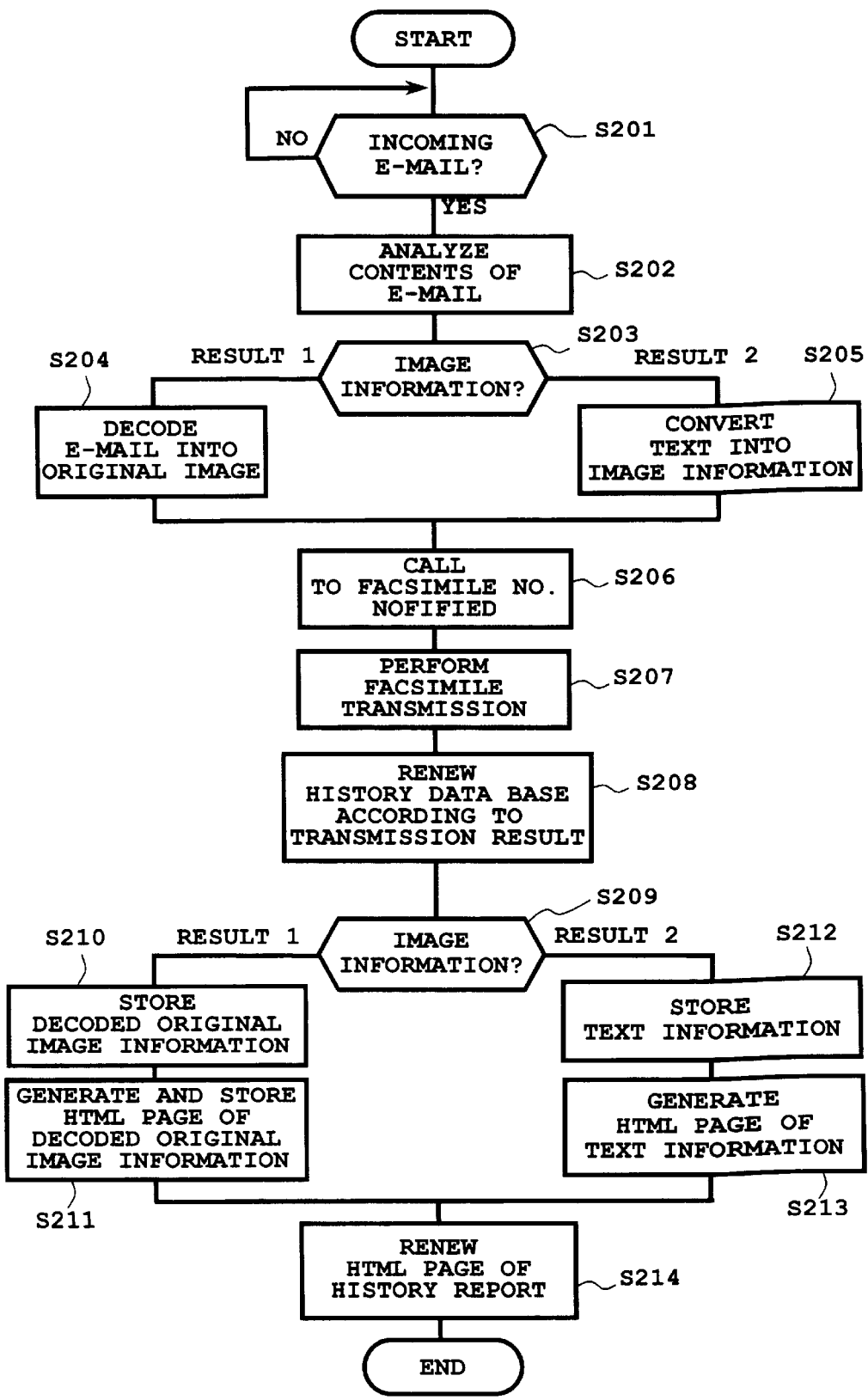
FIG. 11 is a flowchart explaining an exemplary procedure of the network facsimile apparatus of FIG. 2 for transferring image or text information to a facsimile terminal.

Next, another exemplary information transfer operation of the network facsimile apparatus 2 is explained with reference to FIG. 11. In this case, the network facsimile apparatus 2 handles the LAN-to-FAX image and text files. In FIG. 11, the CPU 20 of the network facsimile apparatus 2 checks an incoming E-mail via the communications network 1 in accordance with the POP in Step S201. The check is continued by the NO loop of Step S201 until an incoming E-mail is detected. When an incoming E-mail is detected and the check result of Step S201 is YES, the contents of the received E-mail is analyzed by checking the description of "Content-Type:" field in the mail header in Step S202. Then, in Step S203, CPU 20 determines whether the contents of the received E-mail is image information or text information according to the analysis of Step S202.

If the contents of the received E-mail is image information and the determination result of Step S203 is Result 1, the process proceeds to Step S204 and the CPU 20 decodes the contents of the received E-mail into the original image information in accordance with the MIME. If the contents of the received E-mail is text information and the determination result of Step S203 is Result 2, the process proceeds to Step S205 and the CPU 20 converts the text information into original image information by referring to the font table 21a.

Then, in Step S206, the CPU 20 sends a call to a destination facsimile terminal via the PSTN 13, using a facsimile number which is contained in the "To:" field of the E-mail header. Then, the CPU 20 performs the facsimile transfer operation in accordance with the Group 3 facsimile protocol, in Step S207. Upon completing the facsimile transfer operation, the CPU 20 renews, in Step S208, the communications history file 41 (file name "970522.org") in accordance with the result of the facsimile transfer operation of Step S207.

Then, in Step S209, the CPU 20 again determines whether the contents of the received E-mail is image information or text information in accordance with the analysis of Step S203. When the determination result of Step S209 is Result 1 indicating that the contents of the received E-mail is the image information, the process proceeds to Step S210 and the CPU 20 stores the original image information under a new file name "????.tiff" into the communications information file data base 25a. At this time, the original image information which has been stored in the communications information file data base 25a is regarded as a LAN-to-FAX image file, as described above with reference to FIG. 6. Then, in Step S211, the CPU 20 generates an HTML file based on the LAN-to-FAX image file (file name "????.tiff") and stores the HTML file under a new file name "????.html" in the communication information file data base 25a. To generate the HTML file in Step S211, the CPU 20 uses the information for the file number "????" in the communications history file 41, the file name "970522.html" of the communications history report 42, the file name "????.tiff" of the LAN-to-FAX image file stored in Step S210, and so forth.

When the determination result of Step S209 is Result 2 indicating that the contents of the received E-mail is text information, the process proceeds to Step S212 and the CPU 20 stores the text information as it is under a new file name "????.txt" into the communications information file data base 25a. At this time, the text information which has been stored in the communications information file data base 25a is regarded as a LAN-to-FAX text file, as described above with reference to FIG. 6. Then, in Step S213, the CPU 20 generates an HTML file based on the LAN-to-FAX text file (file name "????.txt") and stores the HTML file under a new file name "????.html" in the communication information file data base 25a. To generate the HTML file in Step S213, the CPU 20 uses the information for the file number "????" in the communications history file 41, the file name "970522.html" of the communications history report 42, the file name "????.txt" of the LAN-to-FAX text file stored in Step S212, and so forth.

Then, in Step S214, the communications history report 42 (file name "970522.html") of FIG. 9 is renewed based on the communications history file 41 (file name "970522.org") which is renewed in Step S208 and the HTML file names corresponding to the LAN-to-FAX image and text files registered in the renewed communications history file 41.

Figure 12:
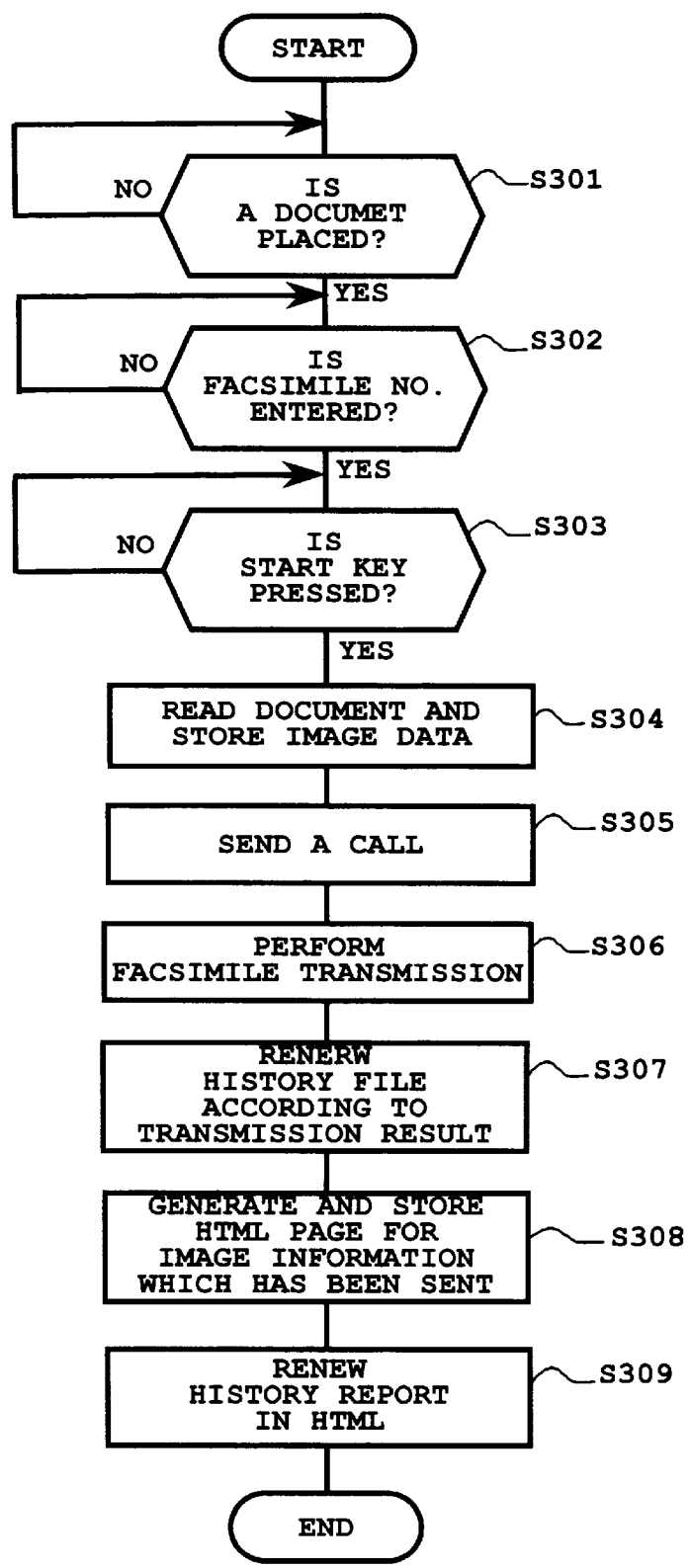
FIGS. 12 is a flowchart explaining another exemplary procedure of the network facsimile apparatus of FIG. 2 for transferring image information that has been read by the apparatus to a facsimile terminal.

Next, another exemplary information transfer operation of the network facsimile apparatus 2 is explained with reference to FIG. 12. In this case, the network facsimile apparatus 2 handles the NF-to-FAX image file. In FIG. 12, the CPU 20 of the apparatus 2 checks whether a document is placed in the scanner 29, in Step S301. The check is continued with the NO loop of Step S301 until placement of a document is detected. When placement of a document is detected and the check result of Step S301 is YES, the CPU 20 performs another loop check in Step S302, in which an entry of a facsimile number for the destination facsimile terminal on the PSTN 13 is watched. Upon detecting an entry of the facsimile number, the CPU 20 performs another loop check in Step S303, in which a press of the start key of the switch and display unit 24 is detected.

Upon detecting a press of the start key, the process proceeds to Step S304 and the CPU 20 instructs the scanner 29 to read the document and stores the read image information from the document into the communications information file data base 25a. At this time, the read image information is stored in the data base 25a as a TIFF file with a file name of "????.tiff" and regarded as the NF-to-FAX image file.

Then, in Step S305, the CPU 20 instructs the communications controller 32 to initiate a call to a destination facsimile terminal using the facsimile number entered in Step S302. Then, in Step S306, the CPU 20 further instructs the communications controller 32 to perform the facsimile transmission operation, in which the NF-to-FAX image file (file name "????.tiff") is transmitted to the called destination facsimile terminal in accordance with the Group 3 facsimile protocol.

Then, in Step S307, the CPU renews the communications history file 41 (file name "970522.org") based on the result of the facsimile transmission operation which has been performed in Step S306. In this process of Step S307, the file number ("????") of the NF-to-FAX image file (file name "????.tiff"), associated with the result of the facsimile transmission operation performed in Step S306, is added as a new record into the communication history file 41.

Then, in Step S308, the CPU 20 generates an HTML file having a file name "????.html" based on the NF-to-FAX image file (file name "????.tiff") and stores the HTML file ("????.html") in the communication information file data base 25a. As shown in FIG. 8, an HTML page can be generated using the information for the file number "????" in the communications history file 41, the file name "970522.html" of the communications history report 42, the file name "????.tiff" of the NF-to-FAX image file, and so forth. Then, in Step S309, the CPU 20 renews the communications history report 42 (file name "970522.html") based on the communications history file 41 (file name "970522.org"), renewed in Step S307, and the plurality of HTML file names corresponding to the image and text information files registered in the communications history file 41.

Figure 13:
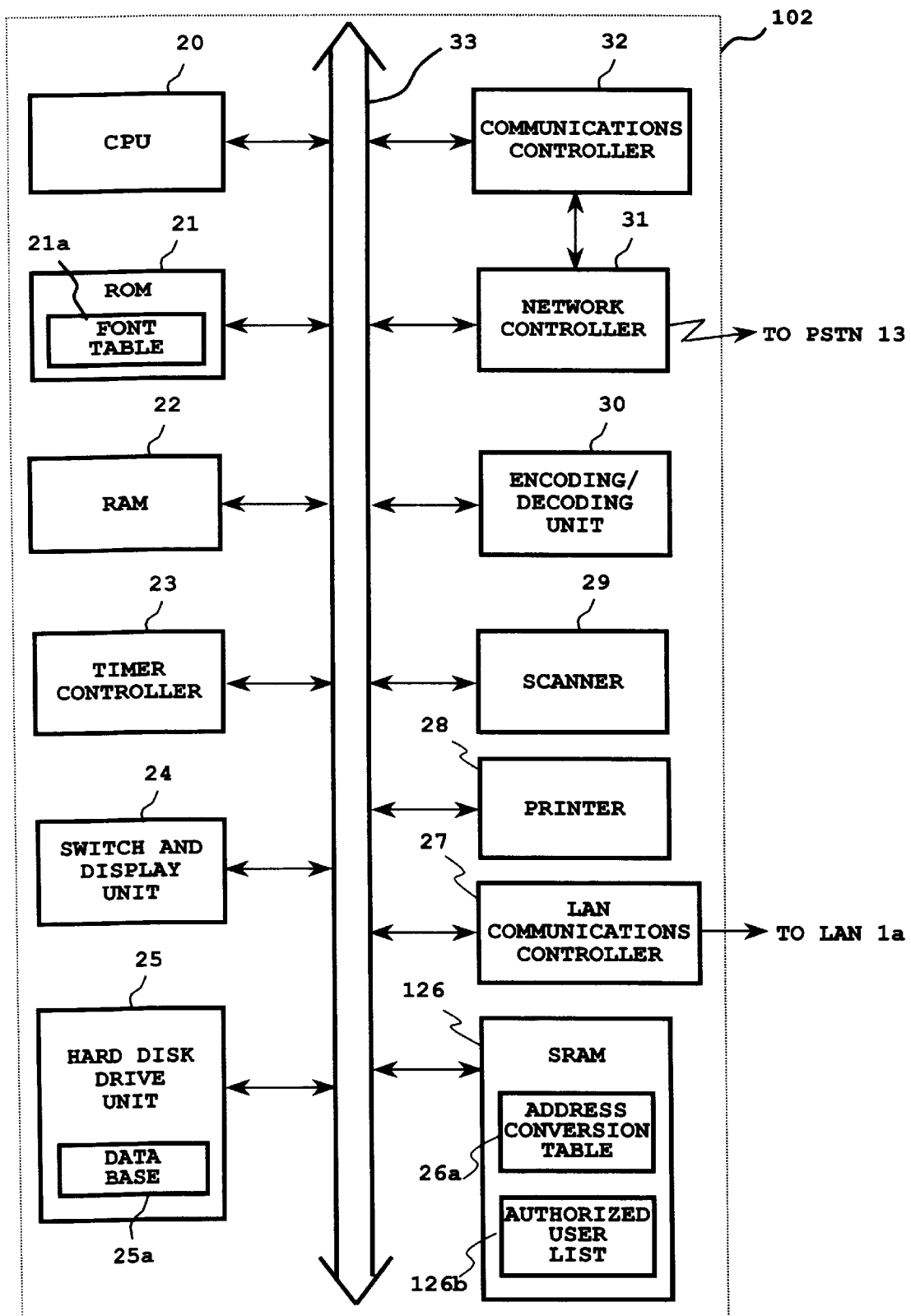
FIG. 13 is a block diagram of a modified model of the network facsimile apparatus of FIG. 2.

Next, an exemplary transfer operation of a modified version of the network facsimile apparatus 2 as an HTTP server for transferring a communications history report 42 in the HTML format is explained with reference to FIGS. 13–15. The modified version of the network facsimile apparatus 2 shown in FIG. 13 is referred to as a network facsimile apparatus 102, of which structure and functions are similar to those of the network facsimile apparatus 2, except for a SRAM 126. The SRAM 126 is similar to the SRAM 26, except for an authorized user list 126b for retaining a plurality of user names with the corresponding passwords in the SRAM 126. Therefore, in describing the apparatus 102, each element thereof, if it corresponds to the element described with reference to FIG. 2, is assigned the same reference numeral as is assigned to the corresponding element of the apparatus 2, and repetitions of the same description for the elements are omitted.

In addition, the network facsimile apparatus 102 is provided with an HTML and HTTP compatible Internet home page browser (application software) which is activated to support the exemplary transfer operation being explained, so as to function as an HTTP server. The client terminals (e.g. client terminal 4a) on the communications network 1 are regarded as the HTTP clients. The authorized user list 126b retains a plurality of authorized user names therein with the corresponding four-digit passwords, as shown in FIG. 15.

Figure 14:
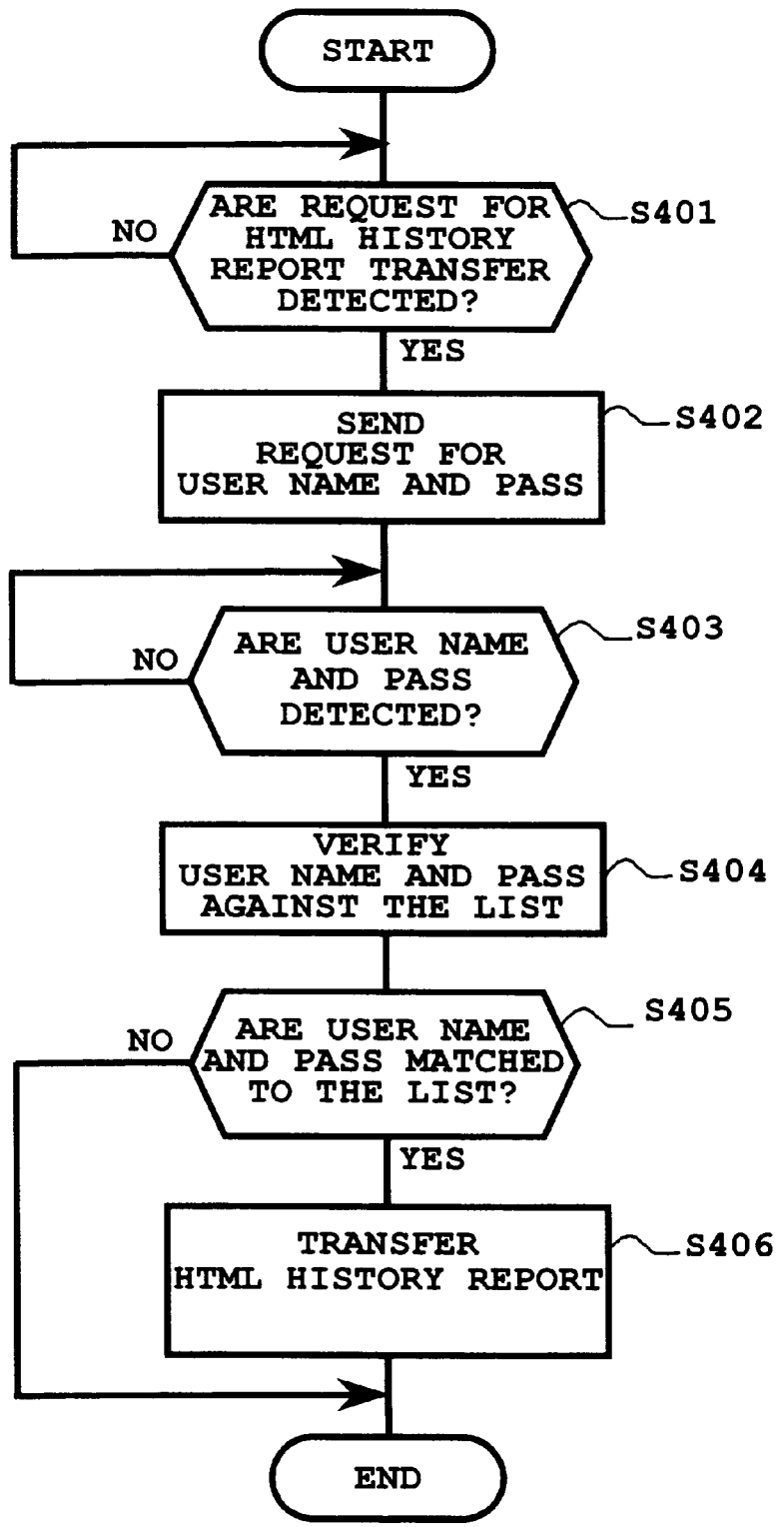
FIG. 14 is a flowchart explaining an exemplary procedure of the network facsimile apparatus of FIG. 2 for transferring a communications history report page in the hyper text markup language to a client terminal.

In Step S401 of FIG. 14, the CPU 20 of the apparatus 102 checks whether the LAN communications controller 27 receives a transfer request for the communications history report in the HTML format from a client terminal (e.g. client terminal 4a) on the communications network 1. With NO loop of Step S401, the CPU 20 continues the check until the LAN communications controller 27 receives the transfer request.

When a transfer request is detected and the check result of Step S401 is YES, the CPU 20 sends back a request for the user name and its password to the client terminal (e.g. client terminal 4a) in Step S402. Then, in Step S403, the CPU 20 checks whether the LAN communications controller 27 receives the user name and password from the client terminal (e.g. client terminal 4a). As Step S403 forms a NO loop, the CPU 20 continues the check until the LAN communication controller 27 receives the name and password.

If the LAN communications controller 27 receives the user name and password and the check result of Step S403 is YES, the CPU 20 verifies the received name and password against the authorized user list 126b in Step S404. The CPU 20 subsequently determines, in Step S405, whether the received user name and password match the authorized user list 126b. If the received user name and password match the authorized user list 126b and the verification result of Step S404 is YES, the process proceeds to Step S406 and the CPU 20 sends the communications history report 42 (file name "970522.html") in the HTTM format to the client terminal (e.g. client terminal 4a) through the communications sequence of FIG. 5. If the received user name and password do not match the authorized user list 126b and the verification result of Step S405 is NO, the process ends.

After receiving the communications history report 42, the client terminal (e.g. client terminal 4a) shows the communications history report image 60 of FIG. 9 on a display (not shown) connected thereto using an Internet home page browser (application software) which is activated on the client terminal (e.g. client terminal 4a).

In this way, the network facsimile apparatus 102 performs the operation for transferring the communication history report image 60 to the client terminals in response to their requests. In addition, the user of the network facsimile apparatus 102 is prevented from sending the report 42 to non-authorized users by means of verification of the user name and password with the authorized user list 126b.

Next, an exemplary transfer operation of the network facsimile apparatus 102 as an HTTP server for transferring image or text information in the HTML format is explained with reference to FIG. 16. In this case, the network facsimile apparatus 102 is provided with an HTML and HTTP compatible Internet home page browser (application software) which is activated to support the exemplary transfer operation being explained, so as to function as an HTTP server. The client terminals (e.g. client terminal 4a) on the communications network 1 operate as HTTP clients, each of which is provided with an HTML and HTTP compatible Internet home page browser (application software). Under this environment, it is assumed that as the result of the transfer operation of the communications history report 42 in the above-described way of FIG. 14 the client terminal (e.g. client terminal 4a) is showing the report 42 on the display (not shown) connected thereto.

Figure 16:
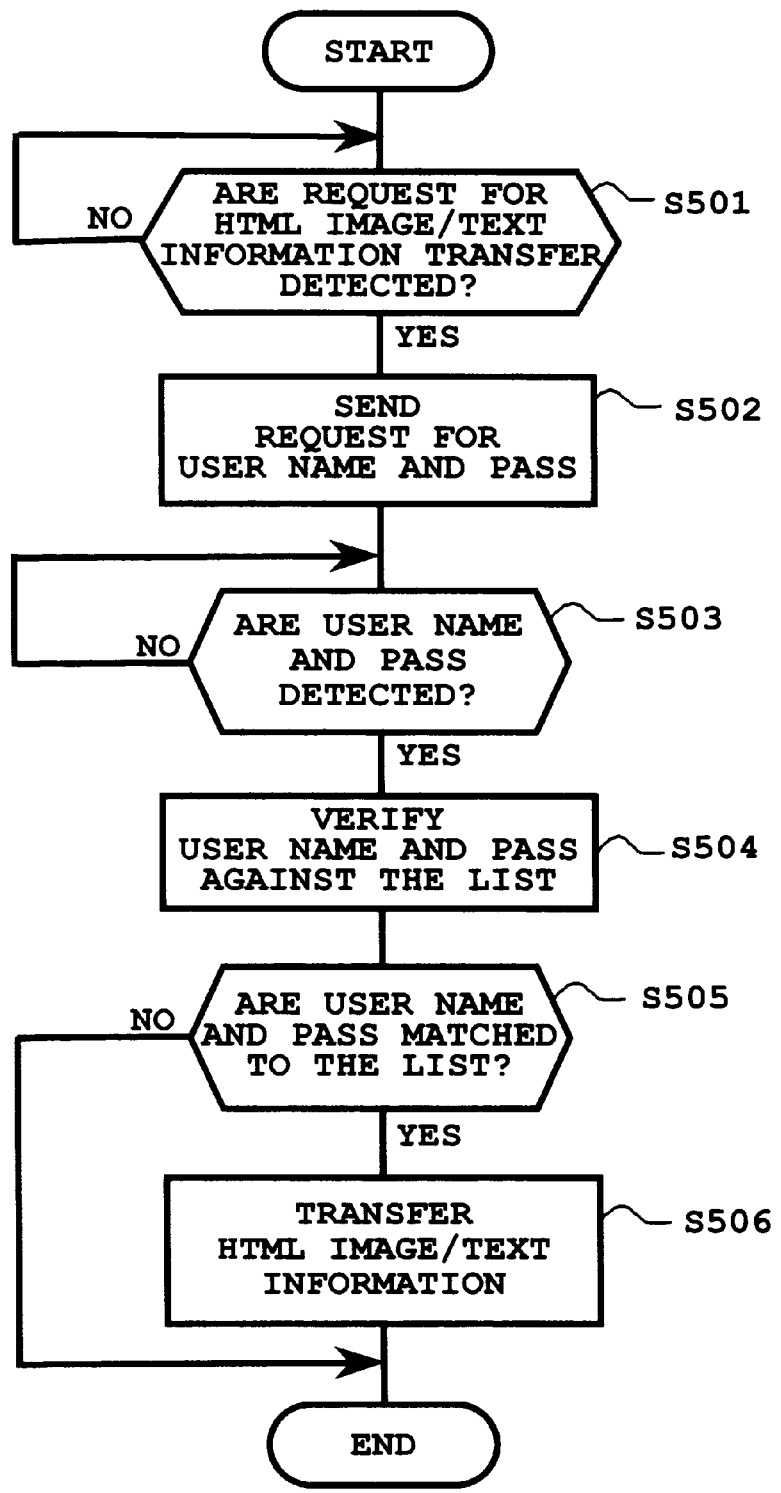
FIG. 16 is a flowchart explaining an exemplary procedure of the network facsimile apparatus of FIG. 2 for transferring an image or text information page in the hyper text markup language to a client terminal.

In Step S501 of FIG. 16, the CPU 20 of the network facsimile apparatus 102 checks whether the LAN communications controller 27 receives a transfer request for image or text information (file name "????.html") in the HTML format from a client terminal (e.g. client terminal 4a) on the communications network 1. With the NO loop of Step S401, the CPU 20 continues the check until the LAN communications controller 27 receives the transfer request.

The above-mentioned HTTL file (file name "????.html") corresponds to one of the file numbers registered in the communications history data base 41 of the network facsimile apparatus 102 (HTTP server), as shown in FIG. 7. If the file number ("????") is "0010," for example, the operator selects the corresponding destination (file number "1122223333") from among the plurality of destinations registered in the communications history report image 60 of FIG. 9, on the client terminal (e.g. client terminal 4a). Subsequently, the HTTP client terminal (e.g. client terminal 4a) sends a request for the HTML file (file name "0010.html") sending a URL corresponding to the file number "0010" to the HTTP server.

When the transfer request is detected and the check result of Step S501 is YES, the CPU 20 sends back a request for the user name and its password to the client terminal (e.g. client terminal 4a) in Step S502. Then, in Step S503, the CPU 20 checks whether the LAN communications controller 27 receives the user name and password from the client terminal (e.g. client terminal 4a). As Step S503 forms a NO loop, the CPU 20 continues the check until the LAN communication controller 27 receives the name and password.

If the LAN communications controller 27 receives the user name and password and the check result of Step S503 is YES, the CPU 20 verifies the received name and password against the authorized user list 126b in Step S504. The CPU 20 subsequently determines, in Step S505, whether the received user name and password match the authorized user list 126b of the SRAM 26. If the received user name and password match the authorized user list 126b and the verification result of Step S504 is YES, the process proceeds to Step S506 and the CPU 20 sends the image or text information file (file name "????.html") in the HTTM format to the client terminal (e.g. client terminal 4a) through the communications sequence of FIG. 5. If the received user name and password do not match the authorized user list 126b and the verification result of Step S505 is NO, the process ends. As an alternative to the image or text information file, the CPU 20 may send the original image or text information file (file name "????.tiff" or "????.txt").

After receiving the image or text information file, the client terminal (e.g. client terminal 4a) shows the image or text in the HTML page 50 of FIG. 8 on a display (not shown) connected thereto using an HTML display function of an Internet home page browser (application software) which is activated on the client terminal (e.g. client terminal 4a). When the "Return-To" block 53 is selected, the transfer operation of FIG. 14 is performed and the communications history report image 60 of FIG. 9 is shown on the display (not shown) of the client terminal (e.g. client terminal 4a). Then, the user may start again the transfer operation of FIG. 16 for requesting another information file, for example.

During this transfer operation, the user of the network facsimile apparatus 102 is prevented from sending the image or text information files in the HTML format to non-authorized users by means of verification of the user name and password with the authorized user list 126b.

The authorized user list 126b of FIG. 15 may be prepared differently for the transfer operations of FIGS. 14 and 16 so that authorization of user access to the communications history report 42 and that to the image or text information file can be separately granted to users according to the user level.

In this way, the network facsimile apparatus 102 performs the operation for transferring the image or text information files to the client terminals in response to their requests.

The embodiment of the present application may be conveniently implemented using a conventional general purpose digital computer programmed according to the teachings of the present specification, as will be apparent to those skilled in the art. Appropriate software coding can readily be prepared based on the teachings of the present disclosure, as will be apparent to those skilled in the art. The present application may also be implemented by the preparation of application specific integrated circuits or by interconnecting an appropriate network of conventional component circuits, as will be readily apparent to those skilled in the art.

This application is based on Japanese Patent Application No. JPAP09-276659 filed Sep. 25, 1997, the entire contents of which are herein incorporated by reference.

Numerous additional modifications and variations of the present application are possible in light of the above teachings. It is therefore to be understood that within the scope of the appended claims, the present application may be practiced otherwise than as specifically described herein.

What I claim is:

1. A communications terminal which is coupled to a local area network and a public switched telephone network, comprising:

a first communications device that transmits and receives image or text information through said local area network using a first predetermined communications procedure;

a second communications device that transmits and receives facsimile image information through said public switched telephone network using a second predetermined communications procedure;

a controller controlling said first and second communications devices to perform information relay operations for relaying image information, which is sent from a facsimile terminal via the public switched telephone network, to a data terminal via the local area network, and for relaying image or text information, which is sent from a data terminal via the local area network, to a facsimile terminal via the public switched telephone network; and a memory storing a first data base which cumulatively retains a plurality of communications history files associated with the respective information relay operations, and a communications history report page including data of said communications history files of said first data base, wherein said controller controls said first communications device to transfer said communications history report page of said first data base to a data terminal via said local area network in response to a first event that said data terminal selects said communications history report page via the local area network using a predetermined page browsing procedure.

2. The communications terminal of claim 1, wherein said memory further stores a second data base which retains a plurality of communications contents files associated with the respective information relay operations, each of said communications history files of said first data base included in said communications history report page being associated with each of said communications contents files of said second data base, and said controller controls said first communications device to transfer said selected communications contents file of said second data base to a data terminal via said local area network in response to a second event that said data terminal selects one of said communications contents files in said communications history report page via the local area network using a predetermined page browsing procedure.

3. The communications terminal of claim 2, wherein said memory prestores an authorized users list, and said controller verifies a user identification sent from said data terminal against said authorized users list, in response to said second event, and controls said first communications device to transfer said selected communications contents file of said second data base to said data terminal via said local area network only when said user identification matches data of said authorized users list.

4. The communications terminal of claim 1, wherein said memory prestores an authorized users list, and said controller verifies a user identification sent from said data terminal against said authorized users list, in response to said first event, and controls said first communications device to transfer said communications history report page to said data terminal via said local area network only when said user identification matches data of said authorized users list.

5. The communications terminal of claim 1, wherein said communications history report page is in accordance with a hyper text markup language (HTML).

6. The communications terminal of claim 1, wherein said predetermined page browsing procedure is in accordance with a hyper text transfer protocol (HTTP).

7. The communications terminal of claim 1, wherein said first predetermined communications procedure is a Group 3 facsimile procedure.

8. The communications terminal of claim 1, wherein said second predetermined communications procedure is at least one of a simple mail transfer protocol (SMTP), a multipurpose Internet message extensions (MIME), and a file transfer protocol (FTP).

9. A communications terminal which is coupled to a local area network and a public switched telephone network, comprising:

first communications means for transmitting and receiving image or text information through said local area network using a first predetermined communications procedure;

second communications means for transmitting and receiving facsimile image information through said public switched telephone network using a second predetermined communications procedure;

controlling means for controlling said first and second communications means to perform information relay operations for relaying image information, which is sent from a facsimile terminal via the public switched telephone network, to a data terminal via the local area network, and for relaying image or text information, which is sent from a data terminal via the local area network, to a facsimile terminal via the public switched telephone network; and memory means for storing a first data base which cumulatively retains a plurality of communications history files associated with the respective information relay operations, and a communications history report page including data of said communications history files of said first data base, wherein said controlling means controls said first communications means to transfer said communications history report page of said first data base to a data terminal via said local area network in response to a first event that said data terminal selects said communications history report page via the local area network using a predetermined page browsing procedure.

10. The communications terminal of claim 9, wherein said memory means further stores a second data base which retains a plurality of communications contents files associated with the respective information relay operations, each of said communications history files of said first data base included in said communications history report page being associated with each of said communications contents files of said second data base, and said controlling means controls said first communications means to transfer said selected communications contents file of said second data base to a data terminal via said local area network in response to a second event that said data terminal selects one of said communications contents files in said communications history report page via the local area network using a predetermined page browsing procedure.

11. The communications terminal of claim 10, wherein said memory means prestores an authorized users list, and said controlling means verifies a user identification sent from said data terminal against said authorized users list, in response to said second event, and controls said first communications means to transfer said selected communications contents file of said second data base to said data terminal via said local area network only when said user identification matches data of said authorized users list.

12. The communications terminal of claim 9, wherein said memory means prestores an authorized users list, and said controlling means verifies a user identification sent from said data terminal against said authorized users list, in response to said first event, and controls said first communications means to transfer said communications history report page to said data terminal via said local area network only when said user identification matches data of said authorized users list.

13. The communications terminal of claim 9, wherein said communications history report page is in accordance with a hyper text markup language (HTML).

14. The communications terminal of claim 9, wherein said predetermined page browsing procedure is in accordance with a hyper text transfer protocol (HTTP).

15. The communications terminal of claim 9, wherein said first predetermined communications procedure is a Group 3 facsimile procedure.

16. The communications terminal of claim 9, wherein said second predetermined communications procedure is at least one of a simple mail transfer protocol (SMTP), a multipurpose Internet message extensions (MIME), and a file transfer protocol (FTP).

17. A method for a communications terminal which is coupled to a local area network and a public switched telephone network, said method comprising the steps of:
- a first communications step for transmitting and receiving image or text information through said local area network using a first predetermined communications procedure;
- a second communications step for transmitting and receiving facsimile image information through said public switched telephone network using a second predetermined communications procedure;
- controlling said first and second communications steps to perform information relay operations for relaying image information, which is sent from a facsimile terminal via the public switched telephone network, to a data terminal via the local area network, and for relaying image or text information, which is sent from a data terminal via the local area network, to a facsimile terminal via the public switched telephone network;
- storing a first data base which cumulatively retains a plurality of communications history files associated with the respective information relay operations, and a communications history report page including data of said communications history files of said first data base; and
- instructing said first communications step to transfer said communications history report page of said first data base to a data terminal via said local area network in response to a first event that said data terminal selects said communications history report page via the local area network using a predetermined page browsing procedure.

18. The method of claim 17, wherein said storing step further stores a second data base which retains a plurality of communications contents files associated with the respective information relay operations, each of said communications history files of said first data base included in said communications history report page being associated with each of said communications contents files of said second data base, and said instructing step instructing said first communications step to transfer said selected communications contents file of said second data base to a data terminal via said local area network in response to a second event that said data terminal selects one of said communications contents files in said communications history report page via the local area network using a predetermined page browsing procedure.

19. The method of claim 18, further comprising a step of verifying a user identification, and wherein said storing step prestores an authorized users list, and said verifying step verifies a user identification sent from said data terminal against said authorized users list, in response to said second event, and said instructing step instructs said first communications step to transfer said selected communications contents file of said second data base to said data terminal via said local area network only when said user identification matches data of said authorized users list.

20. The method of claim 17, further comprising a step of verifying a user identification, and wherein said storing step prestores an authorized users list, and said controlling means verifies a user identification sent from said data terminal against said authorized users list, in response to said first event, and said instructing step instructs said first communications step to transfer said communications history report page to said data terminal via said local area network only when said user identification matches data of said authorized users list.

21. The method of claim 17, wherein said communications history report page is in accordance with a hyper text markup language (HTML).

22. The method of claim 17, wherein said predetermined page browsing procedure is in accordance with a hyper text transfer protocol (HTTP).

23. The method of claim 17, wherein said first predetermined communications procedure is a Group 3 facsimile procedure.

24. The method of claim 17, wherein said second predetermined communications procedure is at least one of a simple mail transfer protocol (SMTP), a multipurpose Internet message extensions (MIME), and a file transfer protocol.

25. An electronic communications system, comprising:
- a plurality of facsimile terminals coupled to a public switched telephone network;
- a plurality of local area networks connected with each other, each local area network comprising a plurality of data terminals and a communications terminal which is coupled to the public switched telephone network, said communications terminal comprising:
  - a first communications device that transmits and receives image or text information through said local area network using a first predetermined communications procedure;
  - a second communications device that transmits and receives facsimile image information through said public switched telephone network using a second predetermined communications procedure;
  - a controller controlling said first and second communications devices to perform information relay operations for relaying image information, which is sent from one of said plurality of facsimile terminals via the public switched telephone network, to at least one of said plurality of data terminals via the local area network, and for relaying image or text information, which is sent from one of said plurality of data terminals via the local area network, to at least one of said plurality of facsimile terminals via the public switched telephone network; and
  - a memory for storing a first data base which cumulatively retains a plurality of communications history files associated with the respective information relay operations, and a communications history report page including data of said communications history files of said first data base,
  - wherein said controller controls said first communications device to transfer said communications history report page of said first data base to one of said plurality of data terminals via said local area network in response to a first event that said one of said plurality of data terminals selects said communications history report page via the local area network using a predetermined page browsing procedure.

26. The electronic communications system of claim 25, wherein said memory further stores a second data base which retains a plurality of communications contents files associated with the respective information relay operations, each of said communications history files of said first data base included in said communications history report page being associated with each of said communications contents files of said second data base, and said controller controls said first communications device to transfer said selected communications contents file of said second data base to one of said plurality of data terminals via said local area network in response to a second event that said one of said plurality of data terminals selects one of said communications contents files in said communications history report page via the local area network using a predetermined page browsing procedure.

27. The electronic communications system of claim 26, wherein said memory prestores an authorized users list, and said controller verifies a user identification sent from said data terminal against said authorized users list, in response to said second event, and controls said first communications device to transfer said selected communications contents file of said second data base to said one of said plurality of data terminals via said local area network only when said user identification matches data of said authorized users list.

28. The electronic communications system of claim 25, wherein said memory prestores an authorized users list, and said controller verifies a user identification sent from said data terminal against said authorized users list, in response to said first event, and controls said first communications device to transfer said communications history report page to said one of said plurality of data terminals via said local area network only when said user identification matches data of said authorized users list.

29. The electronic communications system of claim 25, wherein said communications history report page is in accordance with a hyper text markup language (HTML).

30. The electronic communications system of claim 25, wherein said predetermined page browsing procedure is in accordance with a hyper text transfer protocol (HTTP).

31. The communications terminal of claim 25, wherein said first predetermined communications procedure is a Group 3 facsimile procedure.

32. The electronic communications system of claim 25, wherein said second predetermined communications procedure is at least one of a simple mail transfer protocol (SMTP), a multipurpose Internet message extensions (MIME), and a file transfer protocol (FTP).

33. An electronic communications system, comprising:
   a plurality of facsimile terminal means, coupled to a public switched telephone network, each for transmitting and receiving facsimile information;
   a plurality of local area network means, connected with each other, each for transmitting and receiving image or text information, each comprising a plurality of data terminals and a communications terminal which is coupled to the public switched telephone network, said communications terminal comprising:
      first communications means for transmitting and receiving image or text information through said local area network using a first predetermined communications procedure;
      second communications means for transmitting and receiving facsimile image information through said public switched telephone network using a second predetermined communications procedure;
      controlling means for controlling said first and second communications means to perform information relay operations for relaying image information, which is sent from one of said plurality of facsimile terminals via the public switched telephone network, to at least one of said plurality of data terminals via the local area network, and for relaying image or text information, which is sent from one of said plurality of data terminals via the local area network, to at least one of said plurality of facsimile terminals via the public switched telephone network; and
      memory means for storing a first data base which cumulatively retains a plurality of communications history files associated with the respective information relay operations, and a communications history report page including data of said communications history files of said first data base,
   wherein said controlling means controls said first communications means to transfer said communications history report page of said first data base to one of said plurality of data terminals via said local area network in response to a first event that said one of said plurality of data terminals selects said communications history report page via the local area network using a predetermined page browsing procedure.

34. The electronic communications system of claim 33, wherein said memory means further stores a second data base which retains a plurality of communications contents files associated with the respective information relay operations, each of said communications history files of said first data base included in said communications history report page being associated with each of said communications contents files of said second data base, and said controlling means controls said first communications means to transfer said selected communications contents file of said second data base to one of said plurality of data terminals via said local area network in response to a second event that said one of said plurality of data terminals selects one of said communications contents files in said communications history report page via the local area network using a predetermined page browsing procedure.

35. The electronic communications system of claim 34, wherein said memory means prestores an authorized users list, and said controlling means verifies a user identification sent from said data terminal against said authorized users list, in response to said second event, and controls said first communications means to transfer said selected communications contents file of said second data base to said one of said plurality of data terminals via said local area network only when said user identification matches data of said authorized users list.

36. The communications terminal of claim 33, wherein said memory means prestores an authorized users list, and said controlling means verifies a user identification sent from said data terminal against said authorized users list, in response to said first event, and controls said first communications means to transfer said communications history report page to said one said plurality of data terminals via said local area network only when said user identification matches data of said authorized users list.

37. The communications terminal of claim 33, wherein said communications history report page is in accordance with a hyper text markup language (HTML).

38. The communications terminal of claim 33, wherein said predetermined page browsing procedure is in accordance with a hyper text transfer protocol (HTTP).

39. The communications terminal of claim 33, wherein said first predetermined communications procedure is a Group 3 facsimile procedure.

40. The communications terminal of claim 33, wherein said second predetermined communications procedure is at least one of a simple mail transfer protocol (SMTP), a multipurpose Internet message extensions (MIME), and a file transfer protocol (FTP).

41. A method for an electronic communications system which comprises a plurality of facsimile terminals coupled to a public switched telephone network and a plurality of local area networks connected with each other, each local area network comprising a plurality of data terminals, said method comprising the steps of:

providing a communications terminal which is coupled to said public switched telephone network and to one of said plurality of local area network;

performing a first communications step that transmits and receives image or text information through said local area network using a first predetermined communications procedure;

performing a second communications step that transmits and receives facsimile image information through said public switched telephone network using a second predetermined communications procedure;

controlling said first and second communications steps to perform information relay operations for relaying image information, which is sent from one of said plurality of facsimile terminals via the public switched telephone network, to at least one of said plurality of data terminals via the local area network, and for relaying image or text information, which is sent from one of said plurality of data terminals via the local area network, to at least one of said plurality of facsimile terminals via the public switched telephone network;

storing a first data base which cumulatively retains a plurality of communications history files associated with the respective information relay operations, and a communications history report page including data of said communications history files of said first data base; and instructing said first communications step to transfer said communications history report page of said first data base to one of said plurality of data terminals via said local area network in response to a first event that said one of said plurality of data terminals selects said communications history report page via the local area network using a predetermined page browsing procedure.

42. The method of claim 41, wherein said storing step further stores a second data base which retains a plurality of communications contents files associated with the respective information relay operations, each of said communications history files of said first data base included in said communications history report page being associated with each of said communications contents files of said second data base, and said instructing step instructing said first communications step to transfer said selected communications contents file of said second data base to one of said plurality of data terminals via said local area network in response to a second event that said one of said plurality of data terminals selects one of said communications contents files in said communications history report page via the local area network using a predetermined page browsing procedure.

43. The method of claim 42, further comprising a step of verifying a user identification, and wherein said storing step prestores an authorized users list, and said verifying step verifies a user identification sent from said data terminal against said authorized users list, in response to said second event, and said instructing step instructs said first communications step to transfer said selected communications contents file of said second data base to said one of said plurality of data terminals via said local area network only when said user identification matches data of said authorized users list.

44. The method of claim 41, further comprising a step of verifying a user identification, and wherein said storing step prestores an authorized users list, and said controlling means verifies a user identification sent from said data terminal against said authorized users list, in response to said first event, and said instructing step instructs said first communications step to transfer said communications history report page to said one of said plurality of data terminals via said local area network only when said user identification matches data of said authorized users list.

45. The method of claim 41, wherein said communications history report page is in accordance with a hyper text markup language (HTML).

46. The method of claim 41, wherein said predetermined page browsing procedure is in accordance with a hyper text transfer protocol (HTTP).

47. The method of claim 41, wherein said first predetermined communications procedure is a Group 3 facsimile procedure.

48. The method of claim 41, wherein said second predetermined communications procedure is at least one of a simple mail transfer protocol (SMTP), a multipurpose Internet message extensions (MIME), and a file transfer protocol.

* * * * *